US012371873B2

(12) United States Patent
Kumagai et al.

(10) Patent No.: US 12,371,873 B2
(45) Date of Patent: Jul. 29, 2025

(54) WORK MACHINE

(71) Applicant: Hitachi Construction Machinery Co., Ltd., Tokyo (JP)

(72) Inventors: Kento Kumagai, Ami-machi (JP); Shinya Imura, Toride (JP); Yasutaka Tsuruga, Ryugasaki (JP); Takaaki Chiba, Kasumigaura (JP); Hiroaki Amano, Tsukuba (JP); Shinji Nishikawa, Kasumigaura (JP); Akihiro Narazaki, Tsukuba (JP); Genroku Sugiyama, Ryugasaki (JP); Shinjiro Yamamoto, Ami-machi (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 388 days.

(21) Appl. No.: 17/910,953

(22) PCT Filed: Mar. 31, 2021

(86) PCT No.: PCT/JP2021/013993

§ 371 (c)(1),
(2) Date: Sep. 12, 2022

(87) PCT Pub. No.: WO2021/201158

PCT Pub. Date: Oct. 7, 2021

(65) Prior Publication Data

US 2023/0167622 A1 Jun. 1, 2023

(30) Foreign Application Priority Data

Apr. 2, 2020 (JP) ................................ 2020-066997

(51) Int. Cl.
*E02F 3/43* (2006.01)
*E02F 9/22* (2006.01)
(Continued)

(52) U.S. Cl.
CPC ............ *E02F 3/435* (2013.01); *E02F 9/2203* (2013.01); *E02F 9/2217* (2013.01);
(Continued)

(58) Field of Classification Search
None
See application file for complete search history.

(56) References Cited

U.S. PATENT DOCUMENTS 5,835,874 A 11/1998 Hirata et al.
8,191,364 B2 * 6/2012 Shimada .............. E02F 9/2285 60/494

(Continued)

FOREIGN PATENT DOCUMENTS

JP 11-101202 A 4/1999
JP 3056254 B2 6/2000

(Continued)

OTHER PUBLICATIONS

Machine translation of JP-2017020544-A (Year: 2017).*

(Continued)

*Primary Examiner* — Anne Marie Antonucci
*Assistant Examiner* — Kyle S Park
(74) *Attorney, Agent, or Firm* — Crowell & Moring LLP

(57) ABSTRACT

An object of the present invention is to provide a work machine that can increase the operation speed of an actuator by a regenerating function while ensuring accuracy of position control of the actuator. For this purpose, a controller computes a target actuator supply flow rate by subtracting a regeneration flow rate from a target actuator flow rate, computes a target flow control valve opening amount on the basis of the target actuator supply flow rate, computes a
(Continued)

target pump flow rate equal to or more than the sum of a plurality of the target actuator supply flow rates, controls flow control valves according to the target flow control valve opening amount, and controls a hydraulic pump according to the target pump flow rate.

5 Claims, 12 Drawing Sheets

(51) Int. Cl.

| | |
|---|---|
| ***F15B 11/024*** | (2006.01) |
| ***F15B 11/042*** | (2006.01) |
| ***F15B 11/044*** | (2006.01) |
| ***F15B 11/08*** | (2006.01) |
| ***F15B 11/16*** | (2006.01) |

(52) U.S. Cl.

CPC .......... *E02F 9/2235* (2013.01); *E02F 9/2242* (2013.01); *E02F 9/2282* (2013.01); *E02F 9/2292* (2013.01); *E02F 9/2296* (2013.01); *F15B 11/024* (2013.01); *F15B 11/042* (2013.01); *F15B 11/044* (2013.01); *F15B 11/08* (2013.01); *F15B 11/16* (2013.01); *F15B 2211/20553* (2013.01); *F15B 2211/20576* (2013.01); *F15B 2211/30505* (2013.01); *F15B 2211/3058* (2013.01); *F15B 2211/30595* (2013.01); *F15B 2211/3116* (2013.01); *F15B 2211/327* (2013.01); *F15B 2211/329* (2013.01); *F15B 2211/426* (2013.01); *F15B 2211/455* (2013.01); *F15B 2211/46* (2013.01); *F15B 2211/6306* (2013.01); *F15B 2211/6309* (2013.01); *F15B 2211/6336* (2013.01); *F15B 2211/6346* (2013.01); *F15B 2211/6355* (2013.01); *F15B 2211/6652* (2013.01); *F15B 2211/6654* (2013.01)

(56) References Cited

U.S. PATENT DOCUMENTS

| | | | | |
|---|---|---|---|---|
| 8,336,305 | B2 * | 12/2012 | Matsuura .............. | E02F 9/2207 60/419 |
| 2019/0106861 | A1 | 4/2019 | Izumi et al. | |
| 2020/0115882 | A1 | 4/2020 | Sano et al. | |
| 2023/0022248 | A1 * | 1/2023 | Shibata ................. | E02F 9/2228 |

FOREIGN PATENT DOCUMENTS

| | | | | |
|---|---|---|---|---|
| JP | 3594680 | B2 | | 12/2004 |
| JP | 2017020544 | A | * | 1/2017 |
| JP | 2018-3516 | A | | 1/2018 |
| WO | WO 2018/235779 | A | | 12/2018 |

OTHER PUBLICATIONS

International Search Report (PCT/ISA/210) issued in PCT Application No. PCT/JP2021/013993 dated Jun. 22, 2021 with English translation (four (4) pages).

Japanese-language Written Opinion (PCT/ISA/237) issued in PCT Application No. PCT/JP2021/013993 dated Jun. 22, 2021 (four (4) pages).

International Preliminary Report on Patentability (PCT/IB/338 & PCT/IB/373) issued in PCT Application No. PCT/JP2021/013993 dated Oct. 13, 2022, Including English translation of document C2 (Japanese-language Written Opinion (PCT/ISA/237), filed on Sep. 12, 2022) (five (5) pages).

* cited by examiner

WORK MACHINE

TECHNICAL FIELD

The present invention relates to a work machine such as a hydraulic excavator.

BACKGROUND ART

A work machine such as a hydraulic excavator includes a machine body including a swing structure, and a work device (front implement) attached to the swing structure. The work device includes a boom (front implement member) rotatably connected to the swing structure, an arm (front implement member) rotatably connected to a distal end of the boom, a bucket (front implement member) rotatably connected to a distal end of the arm, a boom cylinder (actuator) that drives the boom, an arm cylinder (actuator) that drives the arm, and a bucket cylinder (actuator) that drives the bucket. In such a work machine, when the boom, the arm, or the bucket is moved singly, the distal end of the bucket moves along an arcuate trajectory. Therefore, when a linear finished surface is to be formed with the use of the distal end of the bucket by an operation of pulling the arm, for example, an operator needs to operate the boom, the arm, and the bucket in a composite manner, and skilled operation techniques are required of the operator.

Accordingly, there is a technology for moving the distal end of the bucket along a design surface (target excavation surface) during the excavation operation (during the operation of the arm or the bucket) by applying a function (machine control) of automatically or semiautomatically controlling the driving of hydraulic actuators by a control system (controller) to excavation work (Patent Document 1).

Meanwhile, some conventional hydraulic excavators include a hydraulic fluid regenerating device that can increase the operation speed of a hydraulic actuator by merging a hydraulic fluid in a tank-side flow passage of the hydraulic actuator into a pump-side flow passage (hydraulic fluid regeneration) (Patent Document 2).

In such a background as described above, in a case where the machine control is applied to a hydraulic excavator including a hydraulic regenerating device capable of increasing the extension and contraction speed of the arm cylinder, when the hydraulic fluid regeneration is performed in the arm cylinder while the distal end of the bucket is moved along the target excavation surface by the machine control, the operation speed of the arm may vary, and the distal end of the bucket may possibly dig in the ground more deeply than the target excavation surface. That is, in a configuration in which the return oil from the actuator is merged into the pump-side flow passage, when a target flow rate for the actuator is set by the machine control (or according to a lever operation made by the operator) and control is performed in such a manner as to make a flow rate of a hydraulic fluid to be supplied from a pump to the actuator coincide with the target flow rate, the flow rate of the hydraulic fluid to be supplied to the actuator becomes higher than the target flow rate, so that accuracy of position control of the actuator cannot be ensured.

In order to solve such a problem, there is a technology for limiting a hydraulic fluid regenerating function by decreasing a regeneration flow rate under conditions where hydraulic regeneration has a large effect when the hydraulic excavator including the hydraulic regenerating device, which is capable of increasing the extension and contraction speed of the cylinder, is operated by the machine control, thereby ensuring accuracy of actuator position control by the machine control (Patent Document 3).

PRIOR ART DOCUMENT

Patent Documents

Patent Document 1: JP-3056254-B
Patent Document 2: JP-3594680-B
Patent Document 3: JP-2018-3516-A

SUMMARY OF THE INVENTION

Problem to be Solved by the Invention

However, in a case where the regenerating function is limited when the work machine described in Patent Document 3 is operated by the machine control, though the accuracy of position control of the actuator can be ensured, the operation speed of the actuator cannot be increased, which may result in the decrease in work efficiency. That is, in a configuration in which the accuracy of position control of the actuator is ensured by setting a target flow rate for the actuator by the machine control (or according to a lever operation made by the operator) and making the flow rate of a hydraulic fluid to be supplied from the pump to the actuator coincide with the target flow rate, the operation speed of the actuator cannot be increased by merging the return oil from the actuator into the pump-side flow passage.

The present invention has been made in view of the above-described problem. It is an object of the present invention to provide a work machine that can increase the operation speed of an actuator by a regenerating function while ensuring accuracy of position control of the actuator.

Means for Solving the Problem

In order to achieve the above object, according to the present invention, there is provided a work machine includes a machine body, a work device attached to the machine body, actuators that drive the machine body or the work device, a hydraulic operating fluid tank, a hydraulic pump that sucks a hydraulic operating fluid from the hydraulic operating fluid tank and supplies the hydraulic operating fluid to a corresponding one of the actuators, flow control valves that are connected in parallel to a delivery line of the hydraulic pump and control a flow of the hydraulic fluid to be supplied from the hydraulic pump to the corresponding one of the actuators, control levers for giving instructions for operation of the actuators, and a controller that controls the flow control valves according to operation instruction amounts from the control levers. The work machine includes a regeneration valve disposed on a hydraulic fluid line that connects a meter-out port and a meter-in port of each of the flow control valves to each other, and a pressure sensor that senses a differential pressure across the regeneration valve. The controller is configured to compute a target actuator flow rate as a target flow rate for each of the actuators on the basis of the operation instruction amounts from the control levers, compute a regeneration flow rate as a flow rate of a hydraulic fluid passing through the regeneration valve on the basis of the differential pressure across the regeneration valve, compute a target actuator supply flow rate by subtracting the regeneration flow rate from the target actuator flow rate, compute a target flow control valve opening amount on the basis of the target actuator supply flow rate, compute a target pump flow rate equal to or more than the sum of a plurality of the target actuator supply flow rates, control the flow control valves according to the target flow control valve opening amount, and control the hydraulic pump according to the target pump flow rate.

According to the present invention configured as described above, the flow control valves and the hydraulic pump are controlled such that the sum of the target flow rate of a hydraulic fluid to be supplied to the actuator from the hydraulic pump (target actuator supply flow rate) and the regeneration flow rate in the actuator are equal to the target flow rate for the actuator (target actuator flow rate). It is thus possible to increase the operation speed of the actuator by a regenerating function while ensuring accuracy of position control of the actuator.

Advantages of the Invention

The work machine according to the present invention can increase the operation speed of the actuator by a regenerating function while ensuring accuracy of position control of the actuator.

MODES FOR CARRYING OUT THE INVENTION

Figure 1:
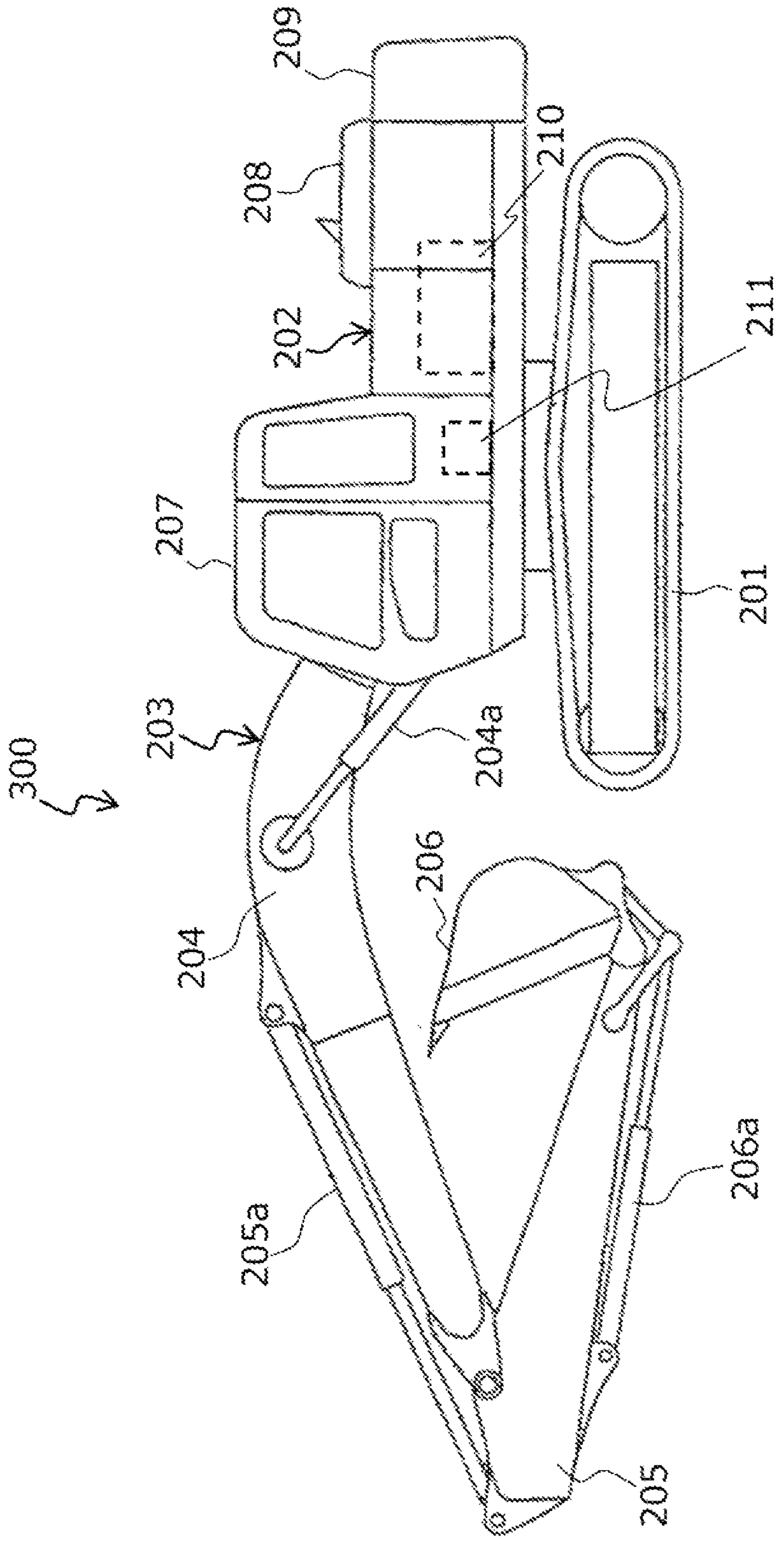
FIG. 1 is a side view of a hydraulic excavator according to an embodiment of the present invention.

Description will hereinafter be made with reference to the drawings by using a hydraulic excavator as an example of a work machine according to an embodiment of the present invention. Incidentally, in the figures, identical members are denoted by the same reference characters, and repeated description thereof will be omitted as appropriate.

FIG. 1 is a side view of a hydraulic excavator according to the present embodiment.

As illustrated in FIG. 1, a hydraulic excavator 300 includes a track structure 201, a swing structure 202 that is swingably disposed on the track structure 201 and that constitutes a machine body, and a work device 203 that is attached to the swing structure 202 to be rotatable in an upward-downward direction and that performs excavation work on soil or the like. The swing structure 202 is driven by a swing motor 211.

The work device 203 includes a boom 204 attached to the swing structure 202 to be rotatable in the upward-downward direction, an arm 205 attached to a distal end of the boom 204 to be rotatable in the upward-downward direction, and a bucket 206 attached to a distal end of the arm 205 to be rotatable in the upward-downward direction. The boom 204 is driven by a boom cylinder 204*a*. The arm 205 is driven by an arm cylinder 205*a*. The bucket 206 is driven by a bucket cylinder 206*a*.

A cab 207 is provided at a front-side position on the swing structure 202. A counterweight 209 that ensures a weight balance is provided at a rear-side position on the swing structure 202. A machine room 208 that houses an engine, hydraulic pumps, and the like is provided between the cab 207 and the counterweight 209. A control valve 210 is installed in the machine room 208. The control valve 210 controls the flow of a hydraulic operating fluid from the hydraulic pumps to respective actuators.

The hydraulic excavator 300 according to the present embodiment is equipped with a hydraulic drive system to be described in each of the following embodiments.

First Embodiment

Figure 2A:
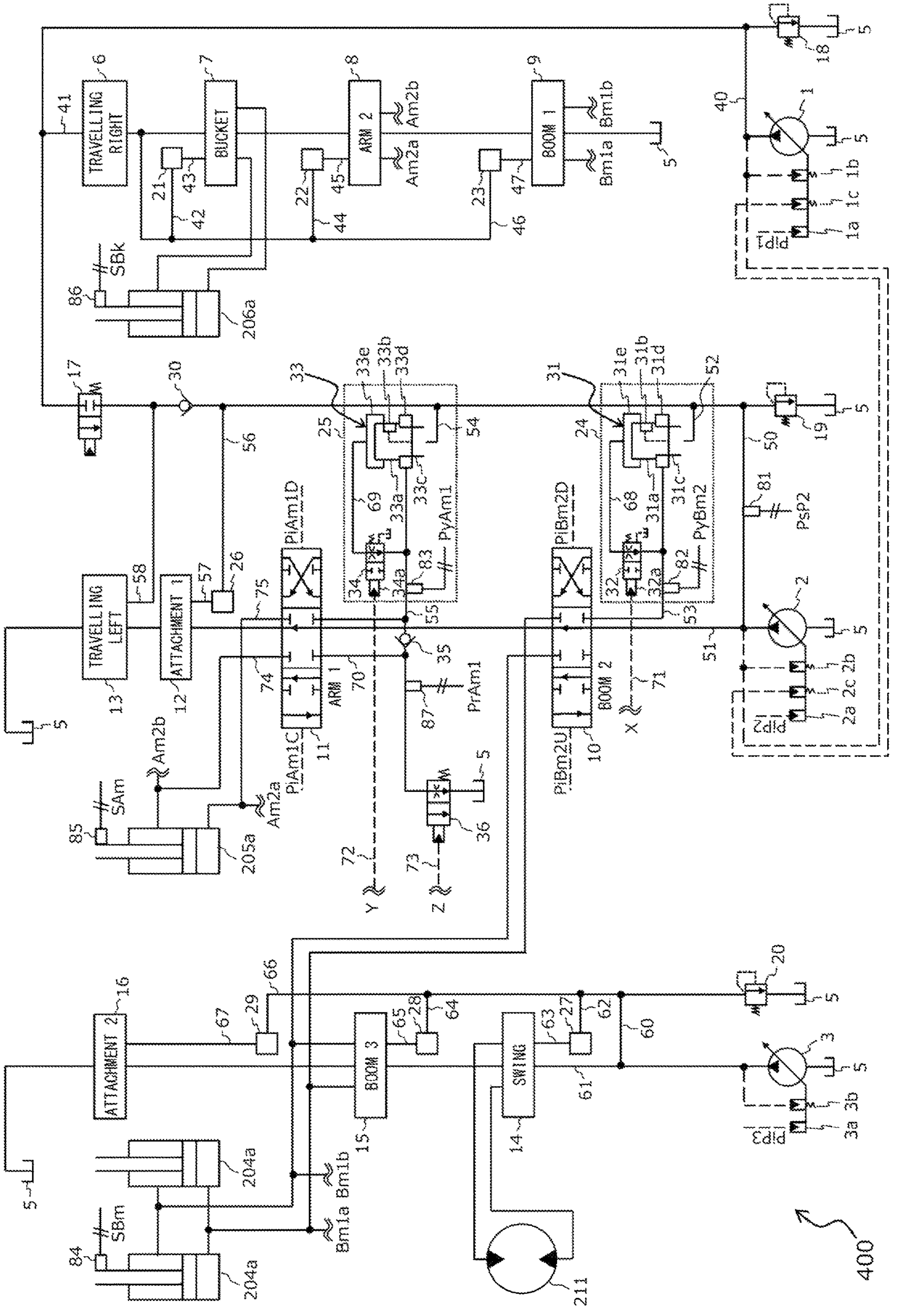
FIG. 2A is a circuit diagram (1/2) of a hydraulic drive system in a first embodiment of the present invention.
Figure 2B:
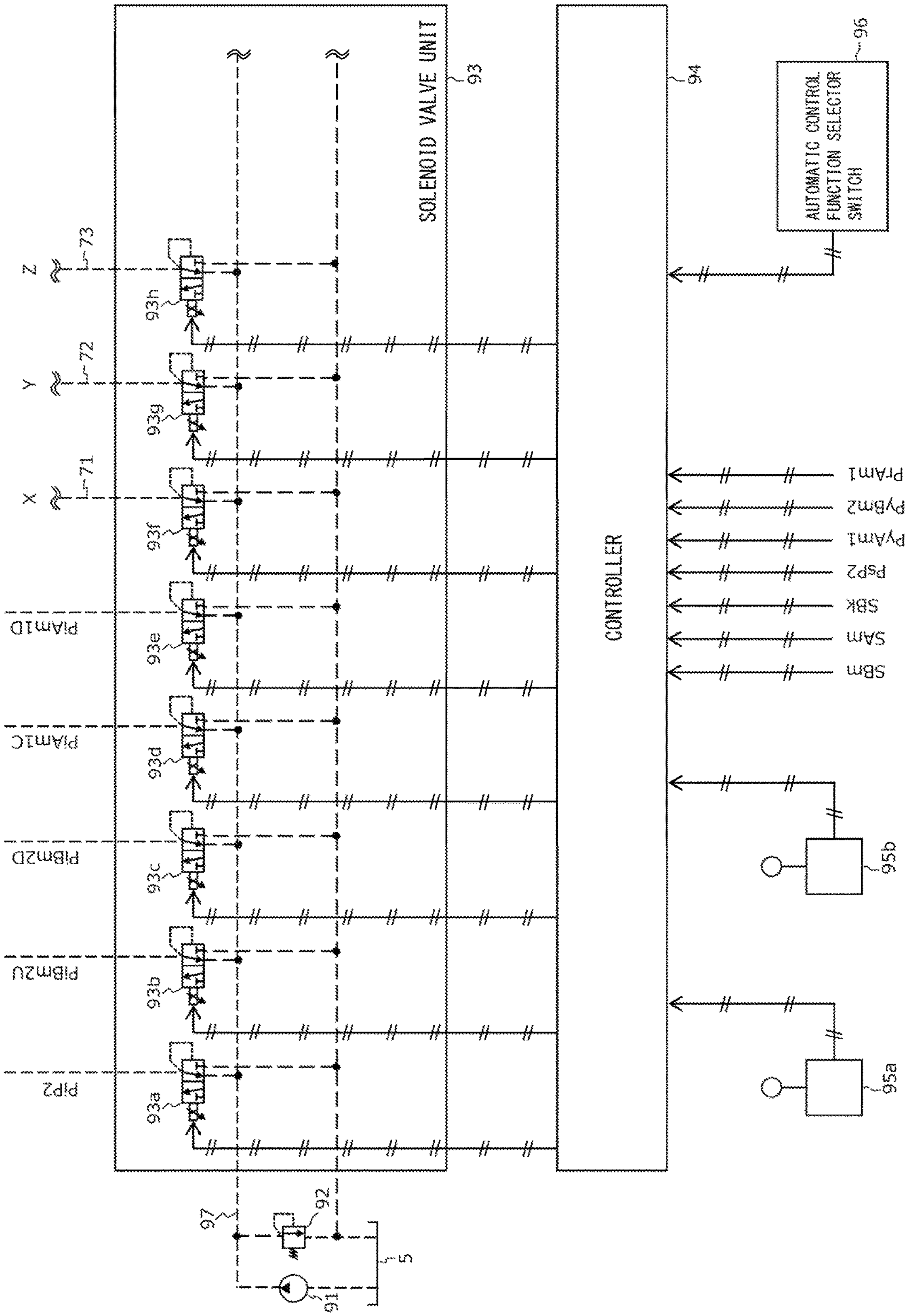
FIG. 2B is a circuit diagram (2/2) of the hydraulic drive system in the first embodiment of the present invention.

FIG. 2A and FIG. 2B are circuit diagrams of a hydraulic drive system in a first embodiment of the present invention.

(1) Configuration

A hydraulic drive system 400 in the first embodiment includes three main hydraulic pumps driven by the engine (not illustrated), for example, a first hydraulic pump 1, a second hydraulic pump 2, and a third hydraulic pump 3 which are each constituted by a variable displacement type hydraulic pump. In addition, the hydraulic drive system 400 includes a pilot pump 91 driven by the engine, and also includes a hydraulic operating fluid tank 5 that supplies oil to the hydraulic pumps 1 to 3 and the pilot pump 91.

The tilting angle of the first hydraulic pump 1 is controlled by a regulator attached to the first hydraulic pump 1. The regulator of the first hydraulic pump 1 includes a flow rate control command pressure port 1*a*, a first hydraulic pump self-pressure port 1*b*, and a second hydraulic pump self-pressure port 1*c*. The tilting angle of the second hydraulic pump 2 is controlled by a regulator attached to the second hydraulic pump 2. The regulator of the second hydraulic pump 2 includes a flow rate control command pressure port 2*a*, a second hydraulic pump self-pressure port 2*b*, and a first hydraulic pump self-pressure port 2*c*. The tilting angle of the third hydraulic pump 3 is controlled by a regulator attached to the third hydraulic pump 3. The regulator of the third hydraulic pump 3 includes a flow rate control command pressure port 3*a* and a third hydraulic pump self-pressure port 3*b*.

A delivery line 40 of the first hydraulic pump 1 is connected to the hydraulic operating fluid tank 5 via a center bypass hydraulic fluid line 41. On the center bypass hydraulic fluid line 41, a right travelling directional control valve 6, a bucket directional control valve 7, a second arm directional control valve 8, and a first boom directional control valve 9 are arranged in order from an upstream side. The right travelling directional control valve 6 controls the driving of a right travelling motor, not illustrated, of a pair of travelling motors for driving the track structure 201. The bucket directional control valve 7 controls the flow of a hydraulic fluid to be supplied to the bucket cylinder 206*a*. The second arm directional control valve 8 controls the flow of a hydraulic fluid to be supplied to the arm cylinder 205*a*. The first boom directional control valve 9 controls the flow of a hydraulic fluid to be supplied to the boom cylinder 204*a*. Respective supply ports of the bucket directional control valve 7, the second arm directional control valve 8, and the first boom directional control valve 9 are connected in parallel to a part of the center bypass hydraulic fluid line 41 between the right travelling directional control valve 6 and the bucket directional control valve 7 via hydraulic fluid lines 42 and 43, hydraulic fluid lines 44 and 45, and hydraulic fluid lines 46 and 47. In addition, the delivery line 40 is connected to the hydraulic operating fluid tank 5 via a main relief valve 18 in order to protect the circuit from an excessive rise in pressure. The delivery line 40 is provided with a pressure sensor (not illustrated) that senses the pressure of the first hydraulic pump 1.

A delivery line 50 of the second hydraulic pump 2 is connected to the hydraulic operating fluid tank 5 via a center bypass hydraulic fluid line 51 and is also connected to the delivery line 40 of the first hydraulic pump 1 via a confluence valve 17. On the center bypass hydraulic fluid line 51, a second boom directional control valve 10, a first arm directional control valve 11, a first attachment directional control valve 12, and a left travelling directional control valve 13 are arranged in order from an upstream side. The second boom directional control valve 10 controls the flow of a hydraulic fluid to be supplied to the boom cylinder 204*a*. The first arm directional control valve 11 controls the flow of a hydraulic fluid to be supplied to the arm cylinder 205*a*. The first attachment directional control valve 12 controls the flow of a hydraulic fluid to be supplied to a first actuator, not illustrated, for driving a first special attachment such as a pulverizer provided in place of the bucket 206. The left travelling directional control valve 13 controls the driving of a left travelling motor, not illustrated, of the pair of travelling motors for driving the track structure 201. Respective supply ports of the second boom directional control valve 10, the first arm directional control valve 11, the first attachment directional control valve 12, and the left travelling directional control valve 13 are connected in parallel to the delivery line 50 of the second hydraulic pump 2 via hydraulic fluid lines 52 and 53, hydraulic fluid lines 54 and 55, hydraulic fluid lines 56 and 57, and a hydraulic fluid line 58. A check valve 30 is provided between a point of connection of the delivery line 50 to the hydraulic fluid line 56 and a point of connection of the delivery line 50 to the hydraulic fluid line 58. The check valve 30 prevents the hydraulic operating fluid supplied to the delivery line 50 via the confluence valve, from flowing into the directional control valves 10 to 12 on the upstream side of the travelling left directional control valve 13. In addition, the delivery line 50 is connected to the hydraulic operating fluid tank 5 via a main relief valve 19 in order to protect the circuit from an excessive rise in pressure. The delivery line 50 is provided with a pressure sensor 81 that senses the pressure of the second hydraulic pump 2.

A meter-out port of the first arm directional control valve 11 is connected to the hydraulic operating fluid tank 5 via a hydraulic fluid line 70. A variable restrictor valve 36 is disposed on the hydraulic fluid line 70. The upstream side of the variable restrictor valve 36 is connected to a hydraulic fluid line 55 via a regeneration valve 35. The regeneration valve 35 allows a hydraulic operating fluid to flow from the hydraulic fluid line 70 (meter-out port of the directional control valve 11) to the hydraulic fluid line 55 (meter-in port of the directional control valve 11), but inhibits the flow of the fluid in an opposite direction. A pressure sensor 87 is provided on the upstream side of the regeneration valve 35. A pressure sensor 83 is provided on the downstream side of the regeneration valve 35.

A delivery line 60 of the third hydraulic pump 3 is connected to the hydraulic operating fluid tank 5 via a center bypass hydraulic fluid line 61. On the center bypass hydraulic fluid line 61, a swing directional control valve 14, a third boom directional control valve 15, and a second attachment directional control valve 16 are arranged in order from an upstream side. The swing directional control valve 14 controls the flow of a hydraulic fluid to be supplied to the swing motor 211. The third boom directional control valve 15 controls the flow of a hydraulic fluid to be supplied to the boom cylinder 204*a*. When a second special attachment provided with a second actuator is mounted on the hydraulic excavator 300 in addition to the first special attachment or when the second special attachment provided with two actuators, that is, the first actuator and the second actuator, is mounted on the hydraulic excavator 300 in place of a first special actuator, the second attachment directional control valve 16 is used to control the flow of a hydraulic fluid to be supplied to the second actuator. Respective supply ports of the swing directional control valve 14, the third boom directional control valve 15, and the second attachment directional control valve 16 are connected in parallel to the delivery line 60 of the third hydraulic pump 3 via hydraulic fluid lines 62 and 63, hydraulic fluid lines 64 and 65, and hydraulic fluid lines 66 and 67. In addition, the delivery line 60 is connected to the hydraulic operating fluid tank 5 via a main relief valve 20 in order to protect the circuit from an excessive rise in pressure. The delivery line 60 is provided with a pressure sensor (not illustrated) that senses the pressure of the third hydraulic pump 3.

In order to obtain the operation state of the hydraulic excavator 300, the boom cylinder 204*a*, the arm cylinder 205*a*, and the bucket cylinder 206*a* are respectively provided with stroke sensors 84, 85, and 86 that sense a stroke amount. Incidentally, means for obtaining the operation state of the hydraulic excavator 300 includes various sensors such as an inclination sensor, a rotation angle sensor, and an IMU (Inertial Measurement Unit), and is not limited to the above-described stroke sensors.

The hydraulic fluid lines 42 and 43 connected to the bucket directional control valve 7, the hydraulic fluid lines 44 and 45 connected to the second arm directional control valve 8, and the hydraulic fluid lines 46 and 47 connected to the first boom directional control valve 9 are respectively provided with flow rate control valves 21, 22, and 23 that limit the flow rate of the hydraulic fluid supplied from the first hydraulic pump 1 to the directional control valves 7 and 8 at a time of a combined operation. The hydraulic fluid lines 52 and 53 connected to the supply port of the second boom directional control valve 10, the hydraulic fluid lines 54 and 55 connected to the supply port of the first arm directional control valve 11, and the hydraulic fluid lines 56 and 57 connected to the supply port of the first attachment directional control valve 12 are respectively provided with auxiliary flow rate control valves 24, 25, and 26 that limit the flow rate of the hydraulic fluid supplied from the second hydraulic pump 2 to the directional control valves 10 to 12 at the time of the combined operation. The hydraulic fluid lines 62 and 63 connected to the supply port of the swing directional control valve 14, the hydraulic fluid lines 64 and 65 connected to the supply port of the third boom directional control valve 15, and the hydraulic fluid lines 66 and 67 connected to the supply port of the second attachment directional control valve 16 are respectively provided with auxiliary flow rate control valves 27, 28, and 29 that limit the flow rate of the hydraulic fluid supplied from the third hydraulic pump 3 to the directional control valves 14 to 16 at the time of the combined operation.

A delivery port of the pilot pump 91 is connected to the hydraulic operating fluid tank 5 via a pilot relief valve 92 for generation of a pilot primary pressure, and is also connected to one input ports of solenoid proportional valves 93*a* to 93*h* included in a solenoid valve unit 93, via a hydraulic fluid line 97. The other input ports of the solenoid proportional valves 93*a* to 93*h* are connected to the hydraulic operating fluid tank 5. The solenoid proportional valves 93*a* to 93*h* each reduce the pilot primary pressure according to a command signal from a controller 94, and thus generate a pilot command pressure.

An output port of the solenoid proportional valve 93*a* is connected to the flow rate control command pressure port 2*a* of the regulator of the second hydraulic pump 2. Output ports of the solenoid proportional valves 93*b* and 93*c* are connected to pilot ports of the second boom directional control valve 10. Output ports of the solenoid proportional valves 93*d* and 93*e* are connected to pilot ports of the first arm directional control valve 11. An output port of the solenoid proportional valve 93*f* is connected to a pilot port of the auxiliary flow control valve 24 (pilot port 32*a* of a pilot variable restrictor 32) via a hydraulic fluid line 71. An output port of the solenoid proportional valve 93*g* is connected to a pilot port of the auxiliary flow control valve 25 (pilot port 34*a* of a pilot variable restrictor 34) via a hydraulic fluid line 72. An output port of the solenoid proportional valve 93*h* is connected to a pilot port of the variable restrictor valve 36 via a hydraulic fluid line 73.

Incidentally, for simplification of the description, the following solenoid proportional valves are not illustrated: solenoid proportional valves for the flow rate control command pressure ports 1*a* and 3*a* of the regulators of the first hydraulic pump 1 and the third hydraulic pump 3, solenoid proportional valves for the right travelling directional control valve 6, solenoid proportional valves for the bucket directional control valve 7, solenoid proportional valves for the second arm directional control valve 8, solenoid proportional valves for the first boom directional control valve 9, solenoid proportional valves for the first attachment directional control valve 12, solenoid proportional valves for the left travelling directional control valve 13, solenoid proportional valves for the swing directional control valve 14, solenoid proportional valves for the third boom directional control valve 15, solenoid proportional valves for the second attachment directional control valve 16, and solenoid proportional valves for the auxiliary flow rate control valves 21 to 23 and 26 to 29.

The auxiliary flow rate control valve 24 includes a seat-type main valve 31 that forms an auxiliary variable restrictor, a control variable restrictor 31*b* that is provided to a valve disc 31*a* of the main valve 31 and that changes an aperture amount according to an amount of movement of the valve disc 31*a*, and a pilot variable restrictor 32. A housing including the main valve 31 has a first pressure chamber 31*c* formed in a connecting portion of the main valve 31 and the hydraulic fluid line 52, a second pressure chamber 31*d* formed in a connecting portion of the main valve 31 and the hydraulic fluid line 53, and a third pressure chamber 31*e* formed to communicate with the first pressure chamber 31*c* via the control variable restrictor 31*b*. The pilot variable restrictor 32 is disposed on a hydraulic fluid line 68 that connects the third pressure chamber 31*e* and the hydraulic fluid line 53 to each other. The pilot port 32*a* of the pilot variable restrictor 32 is connected to the output port of the solenoid proportional valve 93*f*. A pressure sensor 82 is provided on the hydraulic fluid line 53 that connects the second boom directional control valve 10 and the auxiliary flow control valve 24 (main valve 31) to each other. Incidentally, though partly not illustrated for simplification of the description, the auxiliary flow rate control valves 21 to 29 and peripheral components, piping, and wiring all have same configurations.

The hydraulic drive system 400 has a boom control lever 95*a* capable of performing switching operation on the first boom directional control valve 9, the second boom directional control valve 10, and the third boom directional control valve 15 and an arm control lever 95*b* capable of performing switching operation on the first arm directional control valve 11 and the second arm directional control valve 8. Incidentally, for simplification of the description, the following levers are not illustrated: a right travelling control lever that performs switching operation on the right travelling directional control valve 6, a bucket control lever that performs switching operation on the bucket directional control valve 7, a first attachment control lever that performs switching operation on the first attachment directional control valve 12, a left travelling control lever that performs switching operation on the left travelling directional control valve 13, a swing control lever that performs switching operation on the swing directional control valve 14, and a second attachment control lever that performs switching operation on the second attachment directional control valve 16.

The hydraulic drive system 400 includes the controller 94. Input amounts of the control levers 95*a* and 95*b*, output values of the pressure sensors 81 to 83 and 87, and output values of the stroke sensors 84 to 86 are inputted to the controller 94. In addition, the controller 94 outputs command signals to the solenoid proportional valves 93*a* to 93*h* (including the solenoid proportional valves not illustrated) included in the solenoid valve unit 93.

Figure 3:
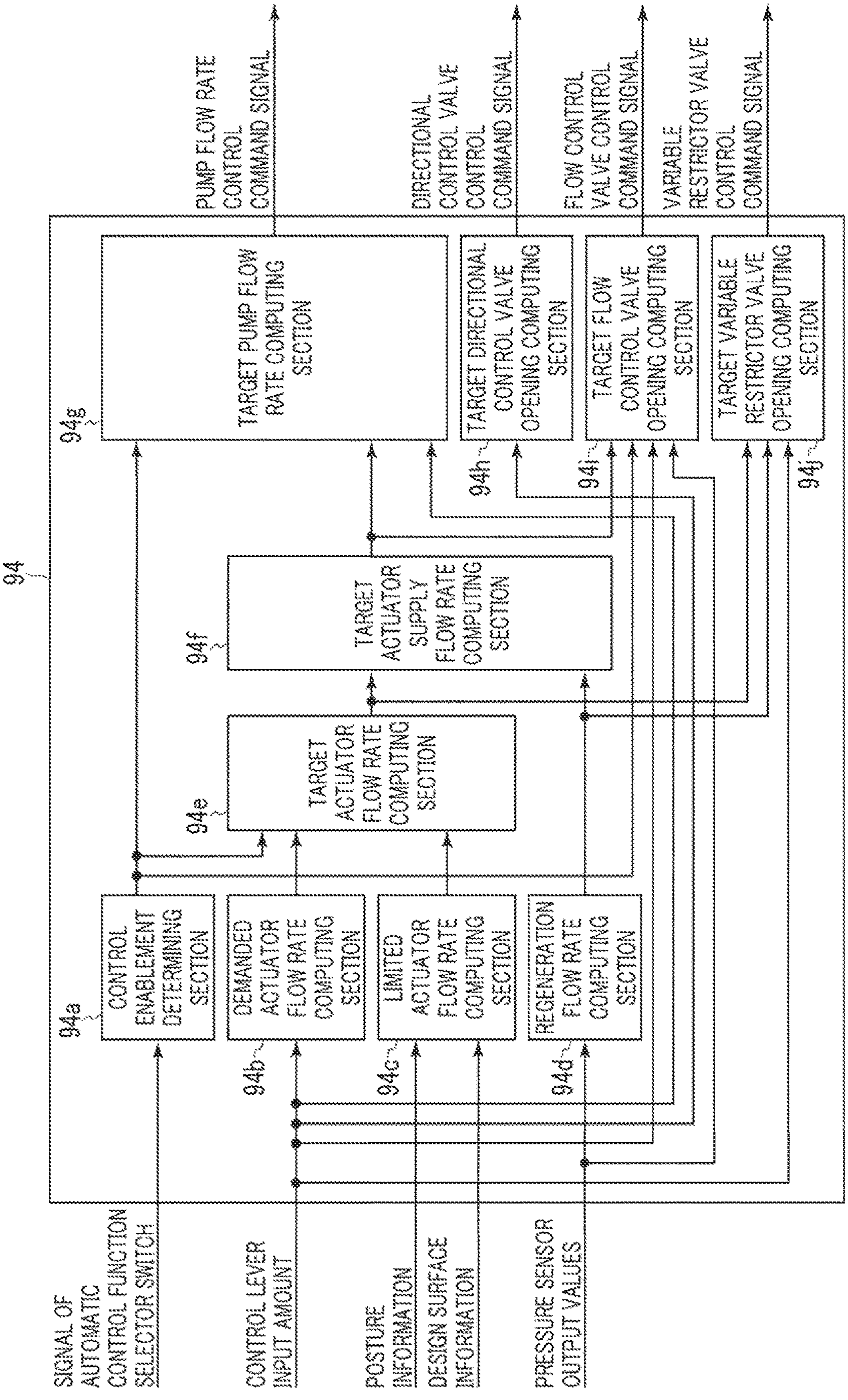
FIG. 3 is a functional block diagram of a controller in the first embodiment of the present invention.

FIG. 3 is a functional block diagram of the controller 94. In FIG. 3, the controller 94 includes a control enablement determining section 94*a*, a demanded actuator flow rate computing section 94*b*, a limited actuator flow rate computing section 94*c*, a regeneration flow rate computing section 94*d*, a target actuator flow rate computing section 94*e*, a target actuator supply flow rate computing section 94*f*, a target pump flow rate computing section 94*g*, a target directional control valve opening computing section 94*h*, a target flow control valve opening computing section 94*i*, and a target variable restrictor valve opening computing section 94*j*.

The control enablement determining section 94*a* determines whether an automatic control function is enabled or disabled, on the basis of a signal of an automatic control function selector switch 96. The demanded actuator flow rate computing section 94*b* computes demanded flow rates for actuators on the basis of the input amounts of the control levers 95*a* and 95*b*. The limited actuator flow rate computing section 94*c* computes, as limited flow rates, actuator flow rates for performing control such that the machine body 202 or the work device 203 does not deviate from a set limited region, on the basis of posture information of the machine body 202 or the work device 203 which is obtained from signals of the stroke sensors 84 to 86 or the like and of design surface information set in advance (including registered target trajectories for the actuators or the like). The regeneration flow rate computing section 94*d* computes a flow rate (regeneration flow rate) of a hydraulic fluid that passes through the regeneration valve 35, from the output values of the pressure sensors and an opening characteristic of the regeneration valve 35 which is set in advance.

The target actuator flow rate computing section 94*e* computes target flow rates (target actuator flow rates) of hydraulic fluids to be supplied to the actuators, on the basis of a determination result from the control enablement determining section 94*a*, the demanded flow rates for the actuators from the demanded actuator flow rate computing section 94*b*, and the limited flow rates for the actuators from the limited actuator flow rate computing section 94*c*. The target actuator supply flow rate computing section 94*f* computes target flow rates (target actuator supply flow rates) of hydraulic fluids to be supplied to the actuators from the hydraulic pumps, on the basis of the target actuator flow rates from the target actuator flow rate computing section 94*e* and the regeneration flow rate from the regeneration flow rate computing section 94*d*.

The target pump flow rate computing section 94*g* computes target flow rates (target pump flow rates) for the hydraulic pumps 1 to 3 on the basis of the determination result from the control enablement determining section 94*a*, the target actuator supply flow rates from the target actuator supply flow rate computing section 94*f*, and the control lever input amounts. The target pump flow rate computing section 94*g* outputs command signals (pump flow rate control command signals) according to the target pump flow rates. The target directional control valve opening computing section 94*h* computes target opening amounts of the directional control valves 6 to 16 on the basis of the input amounts of the control levers 95*a* and 95*b*. The target flow control valve opening computing section 94*i* computes target opening amounts of the auxiliary flow control valves 21 to 29 on the basis of the determination result from the control enablement determining section 94*a*, the target actuator supply flow rates from the target actuator supply flow rate computing section 94*f*, the control lever input amounts, and the pressure sensor output values. The target flow control valve opening computing section 94*i* outputs command signals (flow control valve control command signals) corresponding to the target opening amounts. The target variable restrictor valve opening computing section 94*j* computes a target opening amount of the variable restrictor valve 36 on the basis of the target actuator flow rates from the target actuator flow rate computing section 94*e*, the regeneration flow rate from the regeneration flow rate computing section 94*d*, and the control lever input amounts. The target variable restrictor valve opening computing section 94*j* outputs a command signal (variable restrictor valve control command signal) corresponding to the target opening amount.

Figure 4:
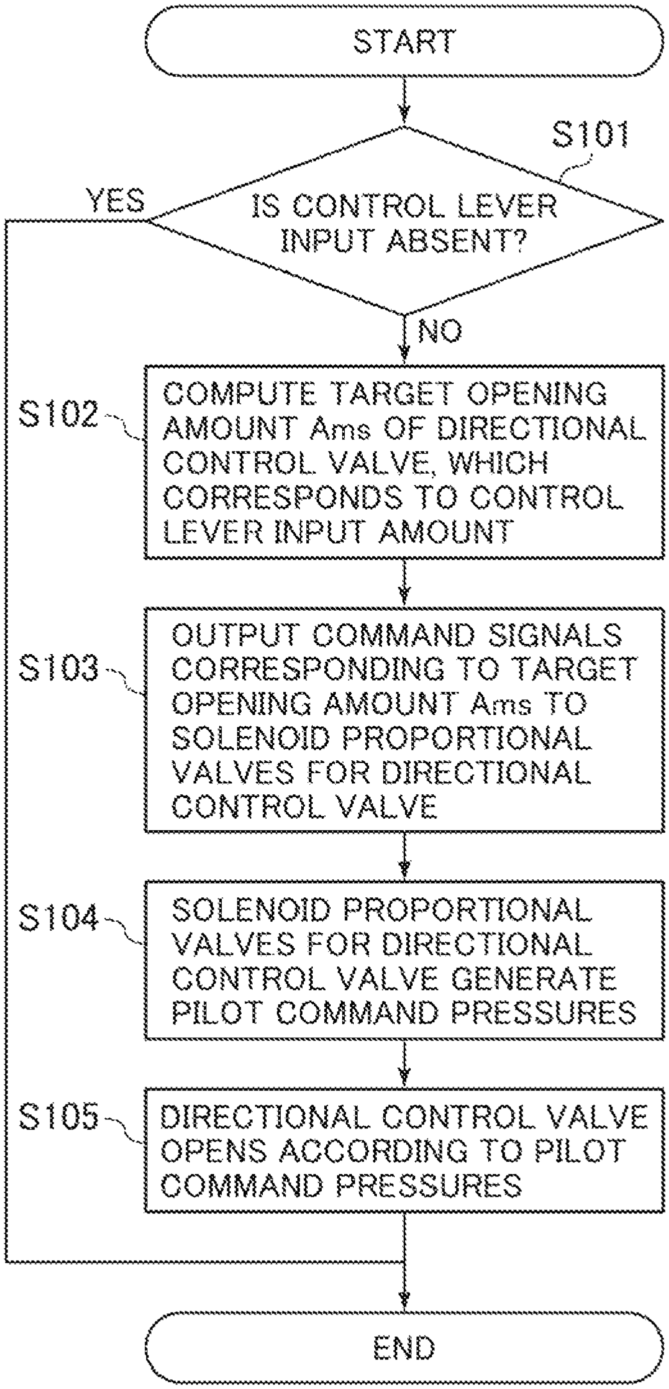
FIG. 4 is a flowchart illustrating processing related to control of directional control valves by the controller in the first embodiment of the present invention.

FIG. 4 is a flowchart illustrating processing related to control of the directional control valves 6 to 16 by the controller 94. In the following, only processing related to the second boom directional control valve 10 will be described. Processing related to the other directional control valves is similar to this, and therefore, description thereof will be omitted.

The controller 94 first determines whether or not input of the boom control lever 95*a* is absent (step S101). When the controller 94 determines in step S101 that there is no input of the boom control lever 95*a* (YES), the controller 94 ends the flow. When the controller 94 determines in step S101 that there is an input of the boom control lever 95*a* (NO), the target directional control valve opening computing section 94*h* of the controller 94 computes a target opening amount Ams of the directional control valve 10 which corresponds to the input amount of the boom control lever 95*a* (step S102).

Following step S102, the controller 94 outputs command signals corresponding to the target opening amount Ams from the controller 94 to the solenoid proportional valves 93*b* and 93*c* for the directional control valve 10 (S103), makes the solenoid proportional valves 93*b* and 93*c* generate pilot command pressures of the directional control valve 10 (S104), makes the directional control valve 10 open according to the pilot command pressures (S105), and then ends the flow.

Figure 5:
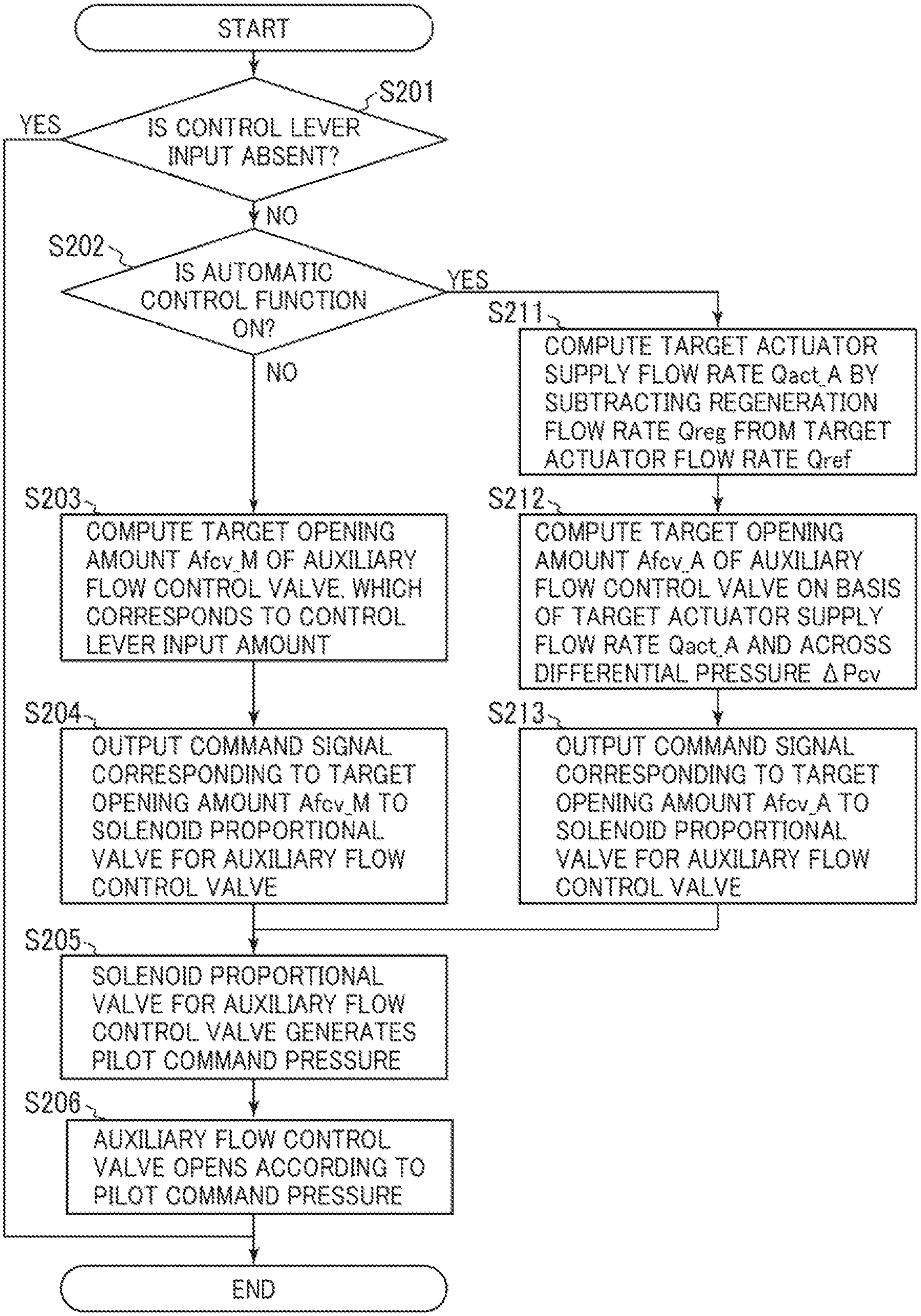
FIG. 5 is a flowchart illustrating processing related to control of auxiliary flow control valves by the controller in the first embodiment of the present invention.

FIG. 5 is a flowchart illustrating processing related to control of the auxiliary flow control valves 21 to 29 by the controller 94. In the following, only processing related to control of the auxiliary flow control valve 24 corresponding to the second boom directional control valve 10 will be described. Processing related to control of the other auxiliary flow control valves is similar to this, and therefore, description thereof will be omitted.

The controller 94 first determines whether or not input of the boom control lever 95*a* is absent (step S201). When the controller 94 determines in step S201 that input of the boom control lever 95*a* is absent (YES), the controller 94 ends the flow. When the controller 94 determines in step S201 that there is an input of the boom control lever 95*a* (NO), the controller 94 determines whether or not the automatic control function (machine control) is enabled (step S202).

When the controller 94 determines in step S202 that the automatic control function is disabled (NO), the target flow control valve opening computing section 94*i* of the controller 94 computes a target opening amount Afcv_M of the auxiliary flow control valve 24 (main valve 31) which corresponds to the input amount of the boom control lever 95*a* (step S203), outputs a command signal corresponding to the target opening amount Afcv_M to the solenoid proportional valve 93*f* for the auxiliary flow control valve 24 (S204), makes the solenoid proportional valve 93*f* generate a pilot command pressure of the auxiliary flow control valve 24 (main valve 31) (S205), makes the auxiliary flow control valve 24 (main valve 31) open according to the pilot command pressure (S206), and then ends the flow.

When the controller 94 determines in step S202 that the automatic control function is enabled (YES), the target actuator supply flow rate computing section 94*f* of the controller 94 computes a target actuator supply flow rate Qact_A by subtracting a regeneration flow rate Qreg from a target actuator flow rate Qref (step S211). The target flow control valve opening computing section 94*i* of the controller 94 computes a target opening amount Afcv_A of the auxiliary flow control valve 24 on the basis of the target actuator supply flow rate Qact_A and a differential pressure ΔPfcv across the auxiliary flow control valve 24 (main valve 31) (step S212), outputs a command signal corresponding to the target opening amount Afcv_A to the solenoid proportional valve 93*f* for the auxiliary flow control valve 24 (step S213), performs the processing of steps S205 and S206, and then ends the flow.

Figure 6:
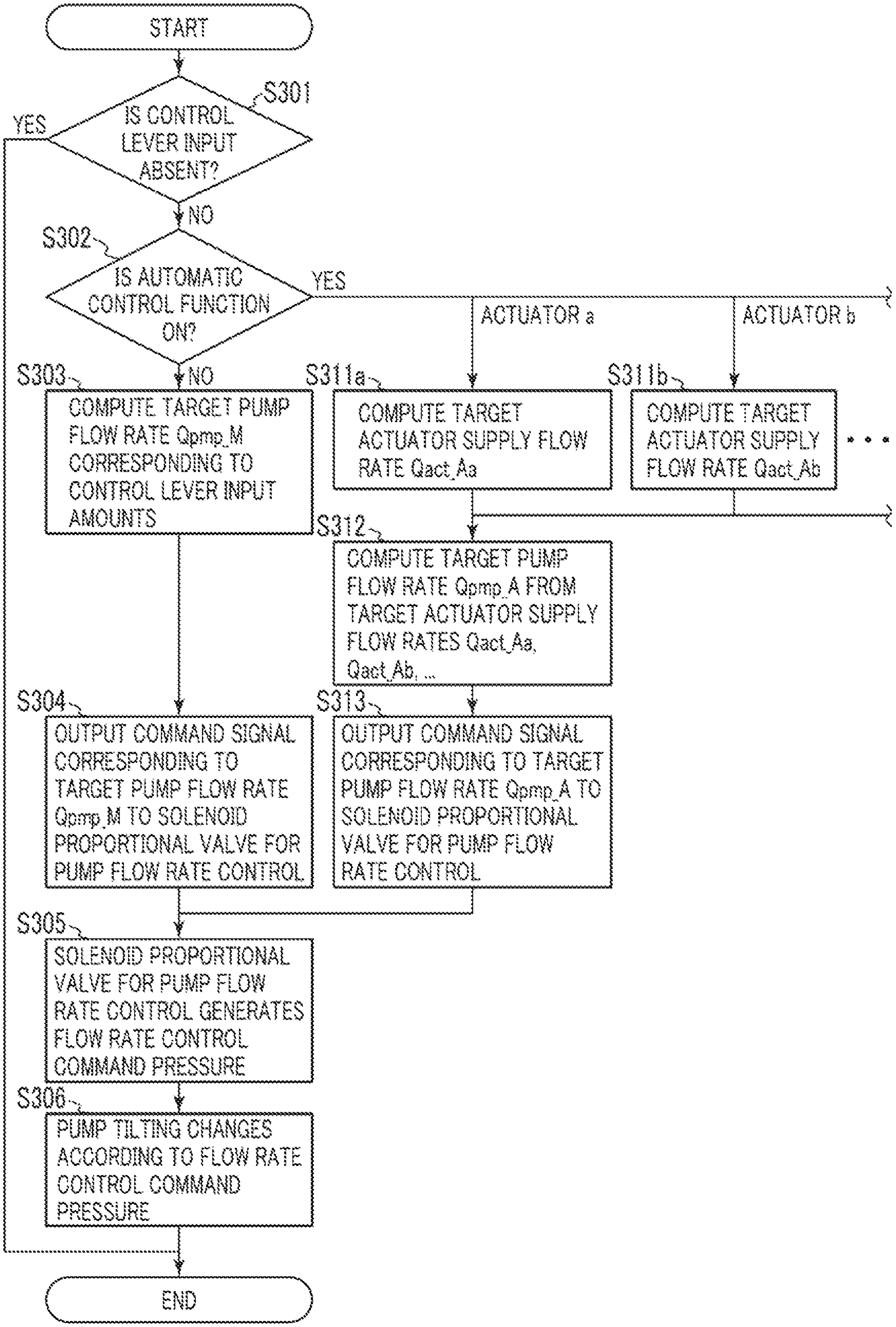
FIG. 6 is a flowchart illustrating processing related to control of hydraulic pumps by the controller in the first embodiment of the present invention.

FIG. 6 is a flowchart illustrating processing related to control of the hydraulic pumps 1 to 3 by the controller 94. In the following, only processing related to control of the second hydraulic pump 2 will be described. Processing related to control of the other hydraulic pumps is similar to this, and therefore, description thereof will be omitted.

The controller 94 first determines whether or not input of the control levers 95*a* and 95*b* is absent (step S301). When the controller 94 determines in step S301 that input of the control levers 95*a* and 95*b* is absent (YES), the controller 94 ends the flow. When the controller 94 determines in step S301 that there is an input of the control levers 95*a* and 95*b* (NO), the controller 94 determines whether or not the automatic control function is enabled (step S302).

When the controller 94 determines in step S302 that the automatic control function is disabled (NO), the target pump flow rate computing section 94*g* of the controller 94 computes a target pump flow rate Qpmp_M for the hydraulic pump 2 which corresponds to the input amounts of the control levers 95*a* and 95*b* (step S303), outputs a command signal corresponding to the target pump flow rate Qpmp_M to the solenoid proportional valve 93*a* for flow rate control on the hydraulic pump 2 (S304), makes the solenoid proportional valve 93*a* generate a flow rate control command pressure PiP2 of the hydraulic pump 2 (S305), makes the tilting of the second hydraulic pump 2 changed according to the flow rate control command pressure PiP2 (S306), and then ends the flow.

When the controller 94 determines in step S302 that the automatic control function is enabled (YES), the target actuator supply flow rate computing section 94*f* of the controller 94 computes target actuator supply flow rates Qact_Aa, Qact_Ab, . . . (steps S311*a*, S311*b*, . . . ). Here, the target actuator supply flow rate Qact_Aa is a target flow rate of a hydraulic fluid to be supplied to the boom cylinder 204*a* from the hydraulic pump 2, and the target actuator supply flow rate Qact_Ab is a target flow rate of a hydraulic fluid to be supplied to the arm cylinder 205*a* from the hydraulic pump 2.

Following steps S311*a*, S311*b*, . . . , the target pump flow rate computing section 94*g* of the controller 94 computes a sum of the target supply flow rates Qact_Aa, Qact_Ab, . . . for the respective actuators as a target pump flow rate Qpmp_A (step S312), outputs a command signal corresponding to the target pump flow rate Qpmp_A to the solenoid proportional valve 93*a* for flow rate control on the hydraulic pump 2 (S313), performs the processing of steps S305 and S306, and then ends the flow. Here, the target pump flow rate Qpmp_A is set as appropriate by a designer, and does not need to precisely coincide with the sum of the target flow rates for the respective actuators. A bleed-off flow rate, a drain flow rate, or the like may be added to the target pump flow rate Qpmp_A.

Figure 7:
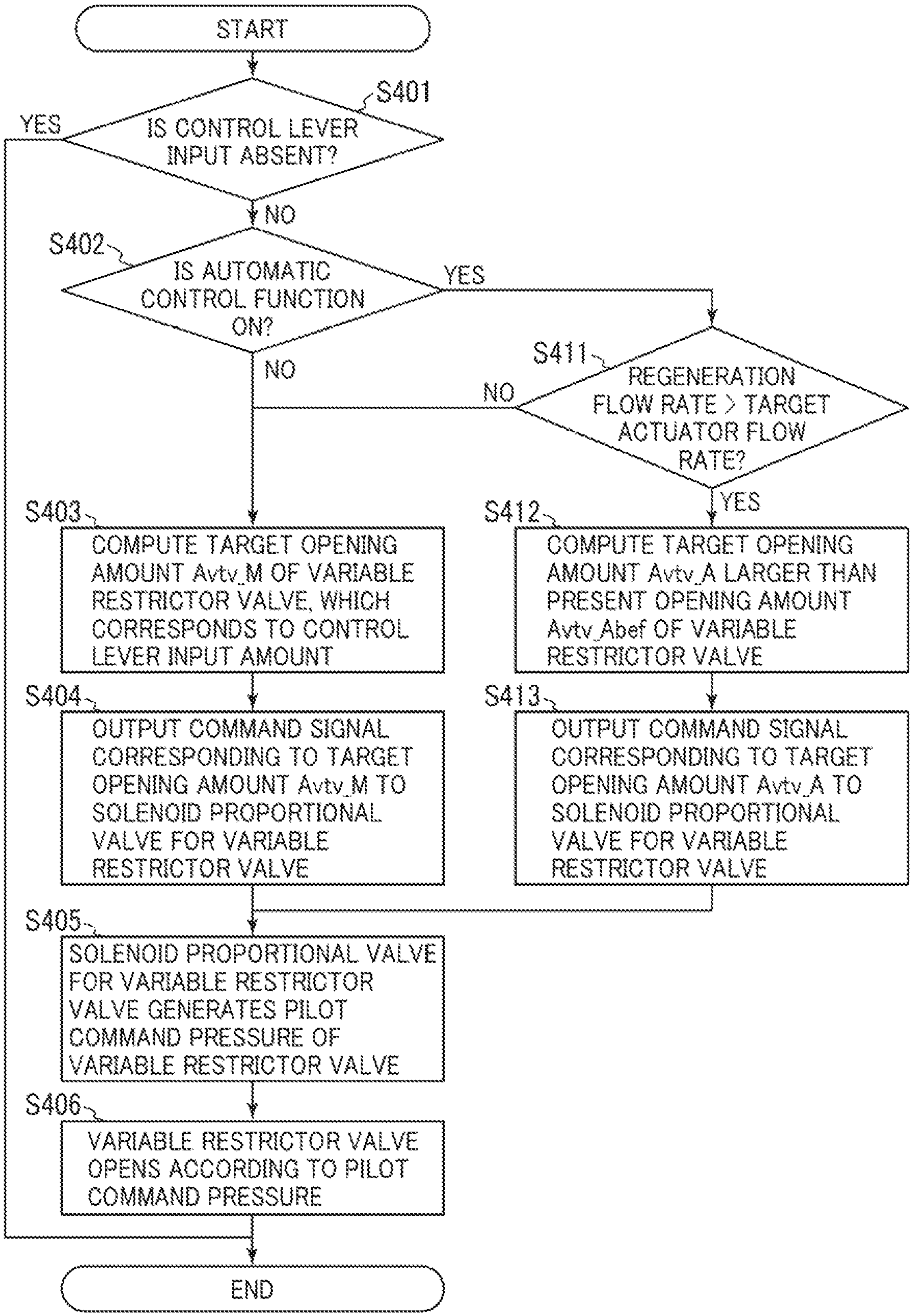
FIG. 7 is a flowchart illustrating processing related to control of a variable restrictor valve by the controller in the first embodiment of the present invention.

FIG. 7 is a flowchart illustrating processing related to control of the variable restrictor valve 36 by the controller 94. In the following, only processing related to control of the variable restrictor valve 36 corresponding to the first arm directional control valve 11 will be described. Processing related to control of the other variable restrictor valves (not illustrated) is similar to this, and therefore, description thereof will be omitted.

The controller 94 first determines whether or not input of the arm control lever 95*b* is absent (step S401). When the controller 94 determines in step S401 that there is no input of the arm control lever 95*b* (YES), the controller 94 ends the flow. When the controller 94 determines in step S401 that there is an input of the arm control lever 95*b* (NO), the controller 94 determines whether or not the automatic control function is enabled (step S402).

When the controller 94 determines in step S402 that the automatic control function is disabled (NO), the target variable restrictor valve opening computing section 94*j* of the controller 94 computes a target opening amount Avtv_M of the variable restrictor valve 36 which corresponds to the input value of the arm control lever 95*b* (step S403), outputs a command signal corresponding to the target opening amount Avtv_M to the solenoid proportional valve 93*h* for the variable restrictor valve 36 (S404), makes the solenoid proportional valve 93*h* generate a pilot command pressure of the variable restrictor valve 36 (S405), makes the variable restrictor valve 36 open according to the pilot command pressure (S406), and then ends the flow. The regeneration flow rate Qreg consequently changes according to the input amount of the arm control lever 95*b*.

When the controller 94 determines in step S402 that the automatic control function is enabled (YES), the target variable restrictor valve opening computing section 94*j* of the controller 94 determines whether or not the regeneration flow rate Qreg is higher than the target actuator flow rate Qref (step S411). When the controller 94 determines in step S411 that the regeneration flow rate Qreg is equal to or less than the target actuator flow rate Qref (NO), the controller 94 performs the processing from step S403 on down. The regeneration flow rate Oreg consequently changes according to the input amount of the arm control lever 95*b* unless the regeneration flow rate Qreg exceeds the target actuator flow rate Qref.

When the controller 94 determines in step S411 that the regeneration flow rate Qreg is higher than the target actuator flow rate Qref (YES), the target variable restrictor valve opening computing section 94*j* of the controller 94 computes a target opening amount Avtv_A larger than a present opening amount Avtv_Abef of the variable restrictor valve 36 (step S412), outputs a command signal corresponding to the target opening amount Avtv_A to the solenoid proportional valve 93*h* for the variable restrictor valve 36 (S413), performs the processing of steps S405 and S405, and then ends the flow. The regeneration flow rate Qreg is consequently limited to the target actuator flow rate Qref or lower.

(2) Operation

Operation of the hydraulic drive system 400 will be described by focusing on parts related to the second hydraulic pump 2. Operation of parts related to the other hydraulic pumps is similar to this, and therefore, description thereof will be omitted.

(2-1) Operation in a State in which the Automatic Control Function is Disabled

Description will be made regarding the operation of the respective components when the arm control lever 95*b* is operated in a state in which the automatic control function is disabled.

Directional Control Valve

The controller 94 computes the target opening amount Ams of the first arm directional control valve 11 which corresponds to the input amount of the arm control lever 95*b*, and outputs command signals corresponding to the target opening amount Ams to the solenoid proportional valves 93*d* and 93*e*. The solenoid proportional valves 93*d* and 93*e* generate pilot command pressures PiAm1U and PiAm1D according to the command signals, and thus control the opening amount of the first arm directional control valve 11.

Auxiliary Flow Control Valve

The controller 94 computes the target opening amount Afcv_M of the auxiliary flow control valve 25 (main valve 33) which corresponds to the input amount of the arm control lever 95*b*, and outputs a command signal corresponding to the target opening amount Afcv_M to the solenoid proportional valve 93*g*. The solenoid proportional valve 93*g* generates a pilot command pressure according to the command signal, and thus controls the opening amount of the auxiliary flow control valve 25 (main valve 33). In the present operation example, control is performed in such a manner as to maximize the opening amount of the auxiliary flow control valve 25 (main valve 33) (fully open the auxiliary flow control valve 25 (main valve 33)).

Hydraulic Pump

The controller 94 computes the target flow rate Qpmp_M for the second hydraulic pump 2 which corresponds to the input amount of the arm control lever 95*b*, and outputs a command signal corresponding to the target flow rate Qpmp_M to the solenoid proportional valve 93*a*. The solenoid proportional valve 93*a* generates the flow rate control command pressure PiP2 according to the command signal, and thus controls the flow rate in the second hydraulic pump 2.

Variable Restrictor Valve

The controller 94 computes the target opening amount Avtv_M of the variable restrictor valve 36 which corresponds to the input amount of the arm control lever 95*b*, and outputs a command signal corresponding to the target opening amount Avtv_M to the solenoid proportional valve 93*h*. The solenoid proportional valve 93*h* generates a pilot command pressure according to the command signal, and thus controls the opening amount of the variable restrictor valve 36.

(2-2) Operation in a State in which the Automatic Control Function is Enabled

Description will be made regarding the operation of the respective components when the arm control lever 95*b* is operated in a state in which the automatic control function is enabled.

Directional Control Valve

The controller 94 computes the target opening amount Ams of the first arm directional control valve 11 which corresponds to the input amount of the arm control lever 95*b*, and outputs command signals corresponding to the target opening amount Ams to the solenoid proportional valves 93*d* and 93*e*. The solenoid proportional valves 93*d* and 93*e* generate the pilot command pressures PiAm1U and PiAm1D according to the command signals, and thus control the opening amount of the first arm directional control valve 11.

Auxiliary Flow Control Valve

The controller 94 computes the target actuator flow rate Qref and the regeneration flow rate Qreg on the basis of the input amount of the arm control lever 95*b*, the posture information of the machine body 202 or the work device 203, the design surface information, and the pressure sensor output values, computes the target actuator supply flow rate Qact_A by subtracting the regeneration flow rate Qreg from the target actuator flow rate Qref, computes the target opening amount Afcv_A of the auxiliary flow control valve 25 (main valve 33) on the basis of the target actuator supply flow rate Qact_A and the differential pressure ΔPfcv across the auxiliary flow control valve 25 (main valve 33), and outputs a command signal corresponding to the target opening amount Afcv_A to the solenoid proportional valve 93*g*. The solenoid proportional valve 93*g* generates a pilot command pressure according to the command signal, and thus controls the opening amount of the auxiliary flow control valve 25 (main valve 33).

Hydraulic Pump

The controller 94 computes the target pump flow rate Qpmp_A by summing the target supply flow rates Qact_A for the respective actuators, and outputs a command signal corresponding to the target pump flow rate Qpmp_A to the solenoid proportional valve 93*a*. The solenoid proportional valve 93*a* generates the flow rate control command pressure PiP2 according to the command signal, and thus controls the flow rate in the second hydraulic pump 2. Incidentally, the present operation is a single operation of the arm cylinder 205*a*, and therefore, the target pump flow rate Qpmp_A is equal to the target supply flow rate Qact_A for the arm cylinder 205*a*.

Variable Restrictor Valve

The controller 94 determines whether or not the regeneration flow rate Qreg is higher than the target actuator flow rate Qref. When a result of the determination indicates YES, the controller 94 computes the target opening amount Avtv_M of the variable restrictor valve 36 which corresponds to the input amount of the arm control lever 95*b*, and outputs a command signal corresponding to the target opening amount Avtv_M to the solenoid proportional valve 93*h*. When the determination result indicates NO, the controller 94 computes the target opening amount Avtv_A larger than the present opening amount Avtv_Abef of the variable restrictor valve 36, and outputs a command signal corresponding to the target opening amount Avtv_A to the solenoid proportional valve 93*h*. The solenoid proportional valve 93*h* generates a pilot command pressure according to the command signal, and thus controls the opening amount of the variable restrictor valve 36.

(3) Effects

In the present embodiment, a work machine 300 includes a machine body 202, a work device 203 attached to the machine body 202, actuators 204*a*, 205*a*, 206*a*, and 211 that drive the machine body 202 or the work device 203, a hydraulic operating fluid tank 5, hydraulic pumps 1 to 3 that suck hydraulic operating fluids from the hydraulic operating fluid tank 5 and that supply the hydraulic operating fluids to the actuators 204*a*, 205*a*, 206*a*, and 211, flow control valves 6 to 16 and 21 to 29 that are connected in parallel to delivery lines 40, 50, and 60 of the hydraulic pumps 1 to 3 and that control the flows of hydraulic fluids to be supplied from the hydraulic pumps 1 to 3 to the actuators 204*a*, 205*a*, 206*a*, and 211, control levers 95*a* and 95*b* for giving instructions for operation of the actuators 204*a*, 205*a*, 206*a*, and 211, and a controller 94 that controls the flow control valves 6 to 16 and 21 to 29 according to operation instruction amounts from the control levers 95*a* and 95*b*. The work machine 300 includes a regeneration valve 35 disposed on a hydraulic fluid line that connects a meter-out port and a meter-in port of the flow control valve 11 to each other, and pressure sensors 87 and 83 that sense a differential pressure across the regeneration valve 35. The controller 94 computes a target actuator flow rate Qref as a target flow rates for each of the actuators 204*a*, 205*a*, 206*a*, and 211 on the basis of the operation instruction amounts from the control levers 95*a* and 95*b*, computes a regeneration flow rate Qreg as a flow rate of a hydraulic fluid passing through the regeneration valve 35 on the basis of the differential pressure across the regeneration valve 35, computes a target actuator supply flow rate Qact_A by subtracting the regeneration flow rate Qreg from the target actuator flow rate Qref, computes a target flow control valve opening amount Afcv_A on the basis of the target actuator supply flow rate Qact_A, computes a target pump flow rate Qpmp_A equal to or more than the sum of the target actuator supply flow rates Qact_A, controls the flow control valves 21 to 29 according to the target flow control valve opening amount Afcv_A, and controls the hydraulic pumps 1 to 3 according to the target pump flow rate Qpmp_A.

In addition, the flow control valves 6 to 16 and 21 to 29 include directional control valves 6 to 16 that control directions of hydraulic fluids to be supplied from the hydraulic pumps 1 to 3 to the actuators 204*a*, 205*a*, 206*a*, and 211 and auxiliary flow control valves 21 to 29 that limit flow rates of hydraulic fluids to be supplied from the hydraulic pumps 1 to 3 to meter-in ports of the directional control valves 6 to 16, and the regeneration valve 35 is disposed on the hydraulic fluid line that connects the meter-out port and the meter-in port of the directional control valve 11 to each other.

According to the present embodiment configured as described above, the flow control valves 21 to 29 and the hydraulic pumps 1 to 3 are controlled such that sums of the target flow rates of the hydraulic fluids to be supplied to the actuators from the hydraulic pumps 1 to 3 (target actuator supply flow rates Qact_A) and the regeneration flow rates Qreg for the actuators are equal to the target flow rates for the actuators (target actuator flow rates Qref). It is thus possible to increase the operation speed of the actuators by a regenerating function while ensuring accuracy of position control of the actuators. Work efficiency of the work machine 100 can thus be improved. Further, when a regeneration flow rate becomes excessive depending on the pressure state of the actuator, a fine adjustment can be made by, for example, increasing the opening amount of the variable restrictor valve 36 and thus reducing the regeneration flow rate. It is thus possible to set and change operability of the actuators easily.

In addition, the work machine 300 according to the present embodiment includes a variable restrictor valve 36 disposed on a hydraulic fluid line 70 that connects the meter-out port of the flow control valve 11 and the hydraulic operating fluid tank 5 to each other, and when the regeneration flow rate Qreg exceeds the target actuator flow rate Qref, the controller 94 increases an opening amount of the variable restrictor valve 36 until the regeneration flow rate Oreg becomes equal to or lower than the target actuator flow rate Qref. It is thus possible to maximize the regeneration flow rate Qreg while maintaining the flow rate of a hydraulic fluid supplied to the actuator at the target flow rate Qact_A.

In addition, the work machine 300 according to the present embodiment includes an automatic control function selector switch 96 that gives an instruction for enabling or disabling an automatic control function of the machine body 202 or the work device 203, and when the automatic control function selector switch 96 gives an instruction for disabling the automatic control function, the controller 94 computes target flow control valve opening amounts Afcv_M and a target pump flow rate Qpmp_M on the basis of the operation instruction amounts from the control levers 95*a* and 95*b*. It is thus possible to increase the operation speed of the actuators by the regenerating function as in a conventional work machine when the automatic control function is disabled.

Second Embodiment

Figure 8A:
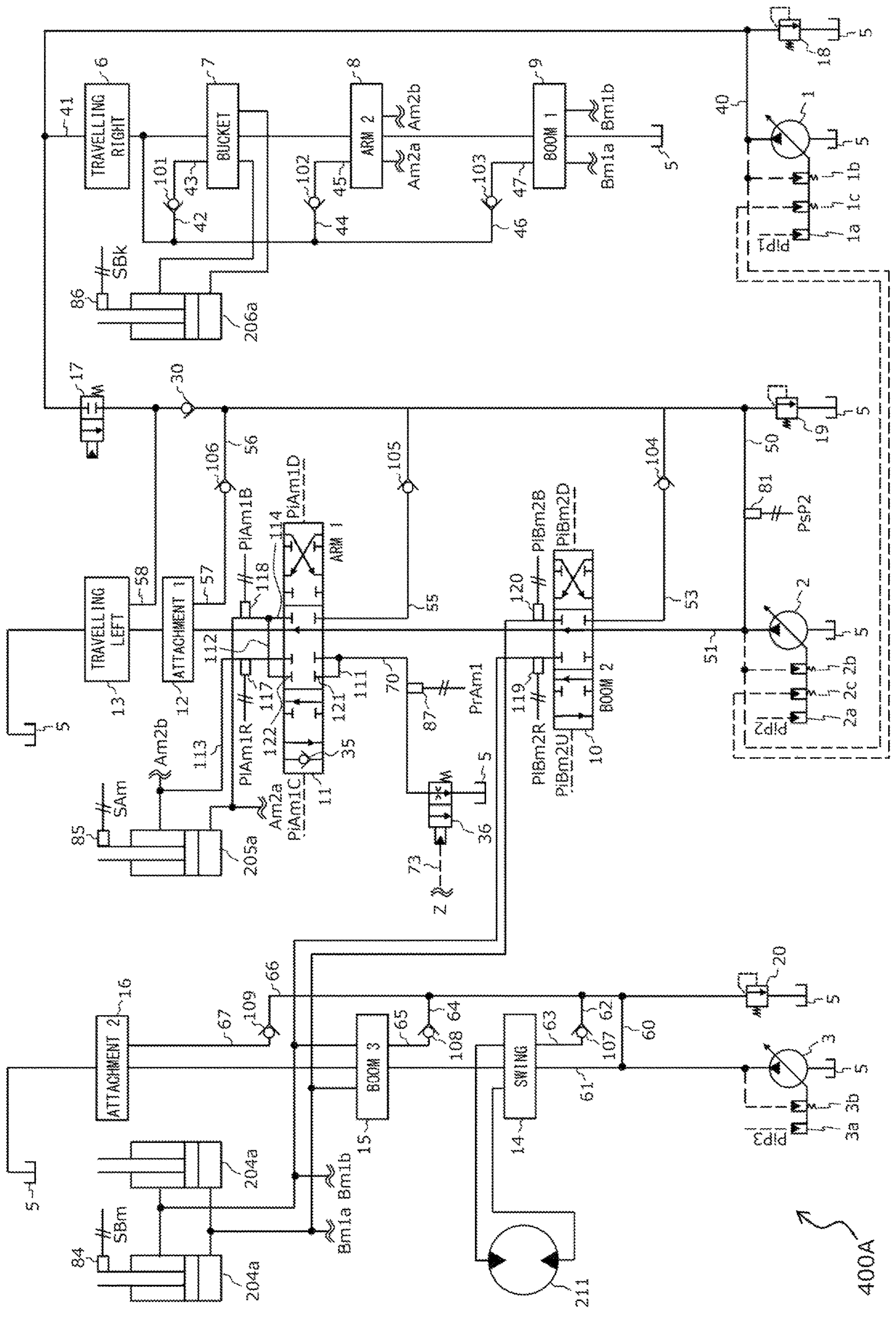
FIG. 8A is a circuit diagram (1/2) of a hydraulic drive system in a second embodiment of the present invention.
Figure 8B:
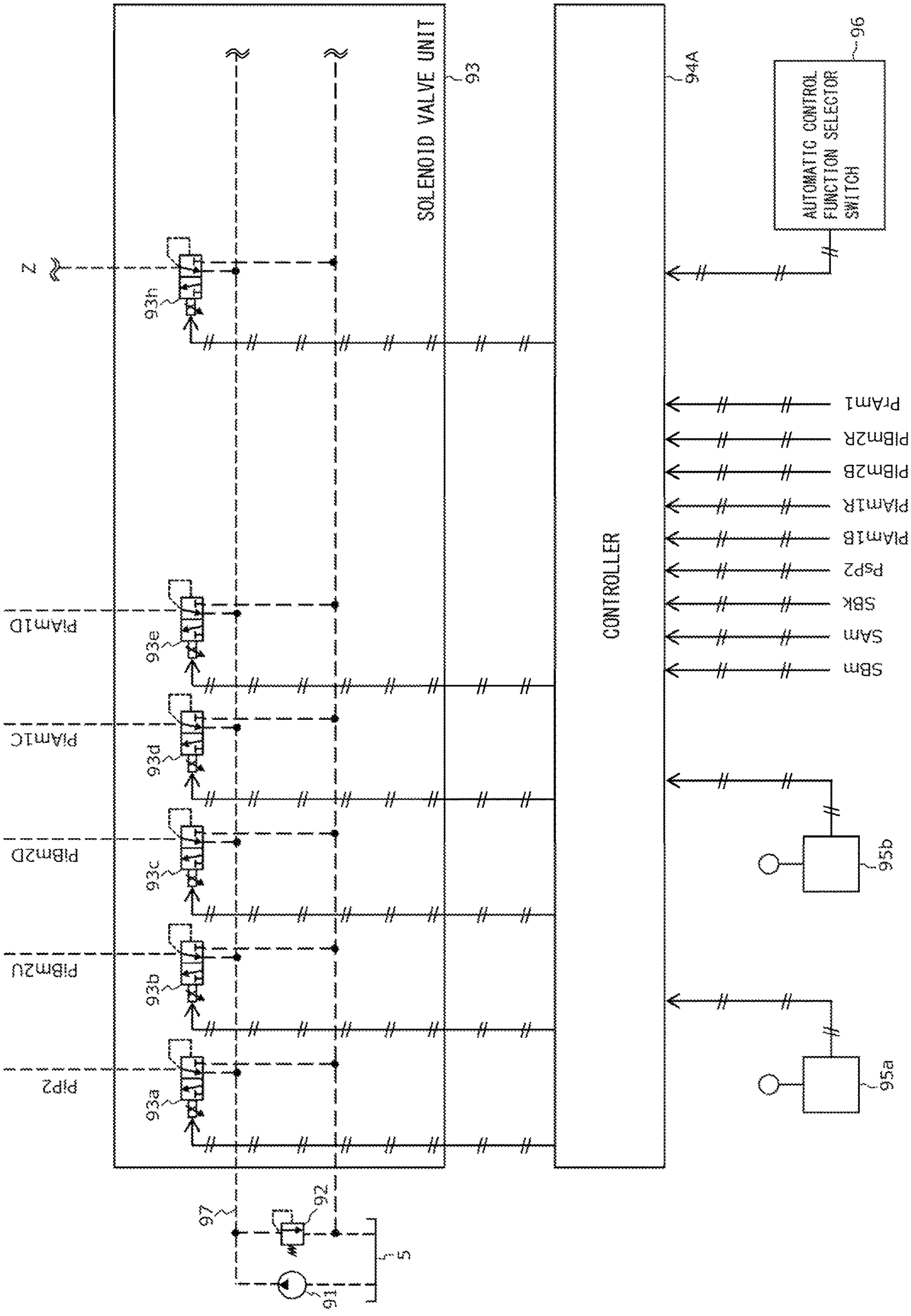
FIG. 8B is a circuit diagram (2/2) of the hydraulic drive system in the second embodiment of the present invention.

FIG. 8A and FIG. 8B are circuit diagrams of a hydraulic drive system in a second embodiment of the present invention.

(1) Configuration

A configuration of a hydraulic drive system 400A in the present embodiment is substantially similar to the hydraulic drive system 400 (illustrated in FIG. 2A and FIG. 2B) in the first embodiment, but is different in the following respects.

The hydraulic drive system 400A in the present embodiment includes, in place of the auxiliary flow control valves 21 to 29 in the first embodiment, check valves 101 to 109 that prevent hydraulic fluids from reversely flowing from actuator sides to the delivery lines 40, 50, and 60.

The regeneration valve 35 in the present embodiment is disposed within a spool of the first arm directional control valve 11. The first arm directional control valve 11 is provided with regeneration ports 121 and 122. The regeneration port 121 is connected with a hydraulic fluid line 111 branched from the hydraulic fluid line 70 connected to the meter-out port of the first arm directional control valve 11. The regeneration port 122 is connected with a hydraulic fluid line 112 branched from a hydraulic fluid line 114 that connects the first arm directional control valve 11 and the bottom side of the arm cylinder 205*a* to each other. When the spool of the first arm directional control valve 11 is operated to be switched to a crowding direction (right direction in the figure), the hydraulic fluid line 111 is connected to the upstream side of the regeneration valve 35, and the hydraulic fluid line 112 is connected to the downstream side of the regeneration valve 35. The hydraulic operating fluid discharged from the rod side of the arm cylinder 205*a* is thus regenerated on the bottom side of the arm cylinder 205*a*. The hydraulic fluid lines 113 and 114 that connect the first arm directional control valve 11 and the arm cylinder 205*a* to each other are provided with pressure sensors 117 and 118, respectively. Incidentally, though partly not illustrated for simplification of the description, the directional control valves 6 to 16 and peripheral components, piping, and wiring all have same configurations.

Figure 9:
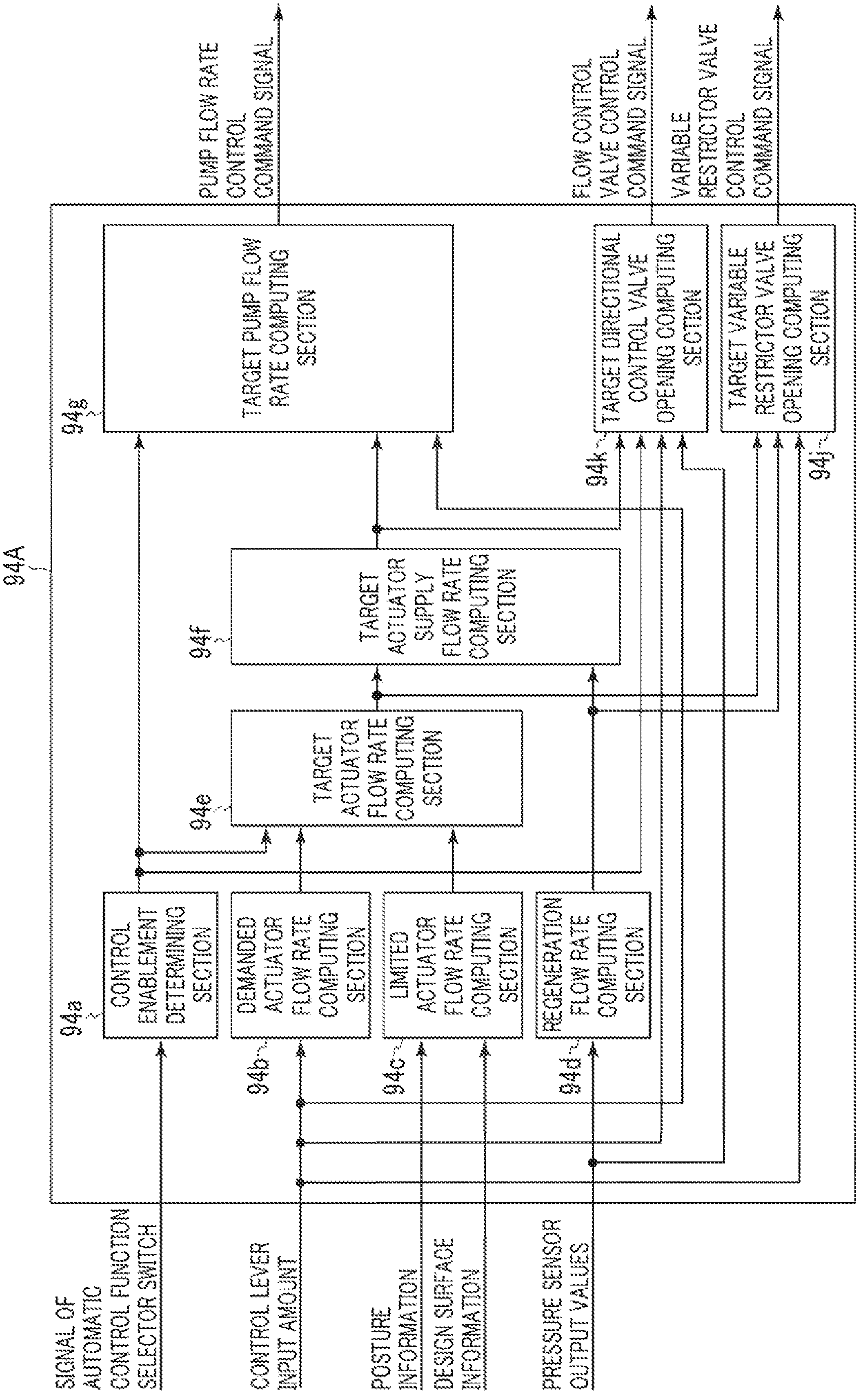
FIG. 9 is a functional block diagram of a controller in the second embodiment of the present invention.

FIG. 9 is a functional block diagram of a controller 94A in the present embodiment. In FIG. 9, the controller 94A in the present embodiment includes a target directional control valve opening computing section 94*k* in place of the target directional control valve opening computing section 94*h* and the target flow control valve opening computing section 94*i* (illustrated in FIG. 3) in the first embodiment. The target directional control valve opening computing section 94*k* computes target opening amounts of the directional control valves on the basis of the determination result from the control enablement determining section 94*a*, the target actuator supply flow rates from the target actuator supply flow rate computing section 94*f*, the control lever input amounts, and the pressure sensor output values.

Figure 10:
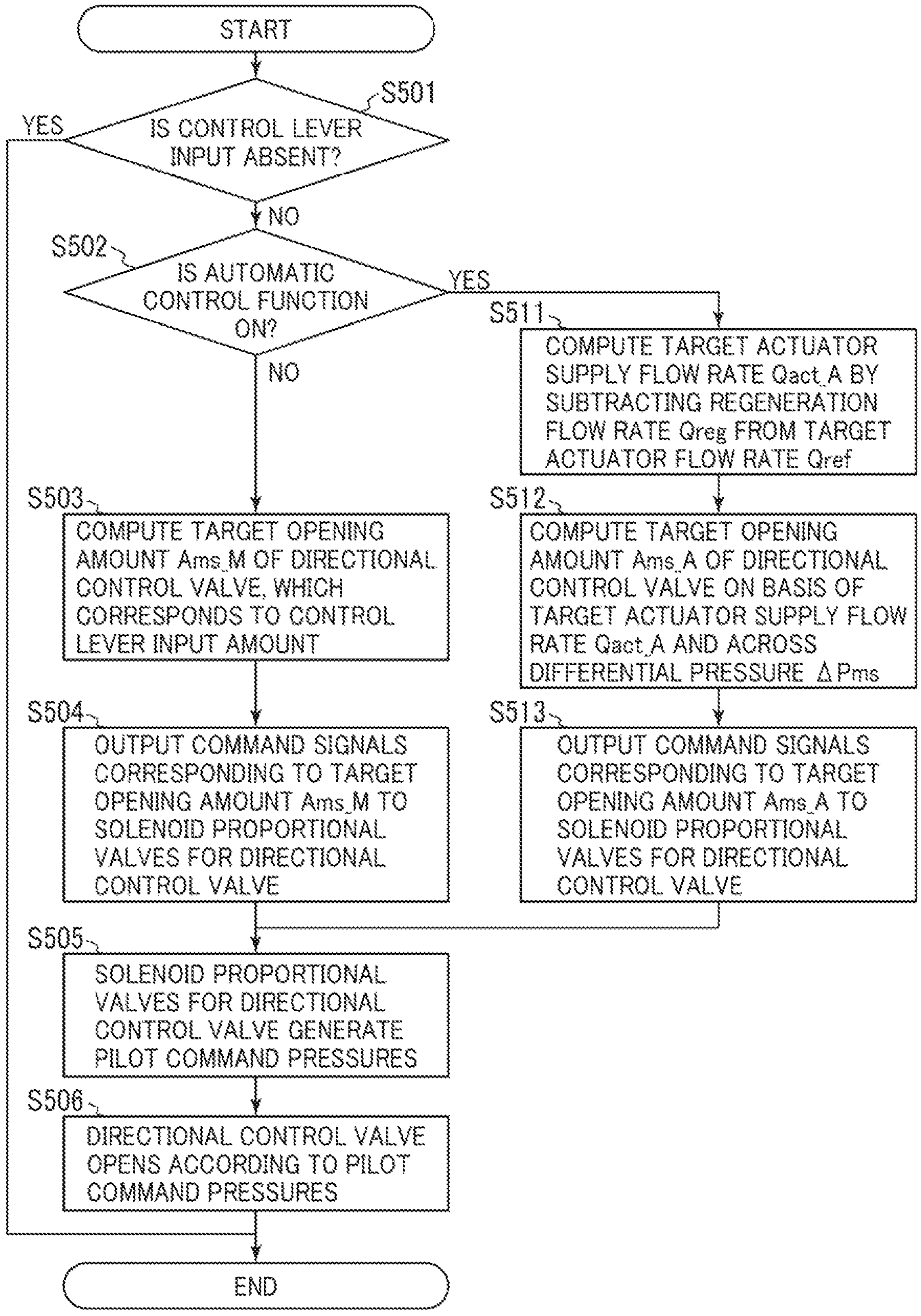
FIG. 10 is a flowchart illustrating processing related to control of directional control valves by the controller in the second embodiment of the present invention.

FIG. 10 is a flowchart illustrating processing related to control of the directional control valves 6 to 16 by the controller 94A. In the following, only processing related to control of the second boom directional control valve 10 will be described. Processing related to control of the other directional control valves is similar to this, and therefore, description thereof will be omitted.

The controller 94A first determines whether or not input of the boom control lever 95*a* is absent (step S501). When the controller 94A determines in step S501 that there is no input of the boom control lever 95*a* (YES), the controller 94A ends the flow. When the controller 94A determines in step S501 that there is an input of the boom control lever 95*a* (NO), the controller 94A determines whether or not the automatic control function (machine control) is enabled (step S502).

When the controller 94A determines in step S502 that the automatic control function is disabled (NO), the target directional control valve opening computing section 94*k* of the controller 94A computes a target opening amount Ams_M of the directional control valve 10 which corresponds to the input amount of the boom control lever 95*a*

(step S503), outputs command signals corresponding to the target opening amount Ams_M to the solenoid proportional valves 93*b* and 93*c* for the directional control valve 10 (S504), makes the solenoid proportional valves 93*b* and 93*c* generate pilot command pressures of the directional control valve 10 (S505), makes the directional control valve 10 open according to the pilot command pressures (S506), and then ends the flow.

When the controller 94A determines in step S502 that the automatic control function is enabled (YES), the target actuator supply flow rate computing section 94*f* of the controller 94A computes the target actuator supply flow rate Qact_A by subtracting the regeneration flow rate Qreg from the target actuator flow rate Qref (step S511). The target directional control valve opening computing section 94*k* of the controller 94A computes a target opening amount Ams_A of the directional control valve 10 on the basis of the target actuator supply flow rate Qact_A and a differential pressure ΔPms across the directional control valve 10 (step S512), outputs command signals corresponding to the target opening amount Ams_A to the solenoid proportional valves 93*b* and 93*c* for the directional control valve 10 (step S513), performs the processing of steps S505 and S506, and then ends the flow.

(2) Operation

Operation of the hydraulic drive system 400A in the second embodiment will be described by focusing on parts related to the second hydraulic pump 2. Operation of parts related to the other hydraulic pumps is similar to this, and therefore, description thereof will be omitted.

(2-1) Operation in a State in which the Automatic Control Function is Disabled

Description will be made regarding the operation of the respective components when the arm control lever 95*b* is operated in a state in which the automatic control function is disabled.

Directional Control Valve

The controller 94A computes the target opening amount Ams_M of the first arm directional control valve 11 which corresponds to the input amount of the arm control lever 95*b*, and outputs command signals corresponding to the target opening amount Ams_M to the solenoid proportional valves 93*d* and 93*e*. The solenoid proportional valves 93*d* and 93*e* generate the pilot command pressures PiAm1U and PiAm1D according to the command signals, and thus control the opening amount of the first arm directional control valve 11.

Hydraulic Pump

Control similar to that in the first embodiment is performed, and therefore, description thereof will be omitted.

Variable Restrictor Valve

Control similar to that in the first embodiment is performed, and therefore, description thereof will be omitted.

(2-2) Operation in a State in which the Automatic Control Function is Enabled

Description will be made regarding the operation of the respective components when the arm control lever 95*b* is operated in a state in which the automatic control function is enabled.

Directional Control Valve

The controller 94A computes the target actuator flow rate Qref and the regeneration flow rate Qreg on the basis of the input amount of the arm control lever 95*b*, the posture information of the machine body 202 or the work device 203, the design surface information, and the pressure sensor output values, computes the target actuator supply flow rate Qact_A by subtracting the regeneration flow rate Qreg from the target actuator flow rate Qref, computes the target opening amount Ams_A of the directional control valve 11 on the basis of the target actuator supply flow rate Qact_A and the differential pressure ΔPms across the directional control valve 11, and outputs command signals corresponding to the target opening amount Ams_A to the solenoid proportional valves 93*d* and 93*e*. The solenoid proportional valves 93*d* and 93*e* generate the pilot command pressures PiAm1U and PiAm1D according to the command signals, and thus control the opening amount of the directional control valve 11.

Hydraulic Pump

Control similar to that in the first embodiment is performed, and therefore, description thereof will be omitted.

Variable Restrictor Valve

Control similar to that in the first embodiment is performed, and therefore, description thereof will be omitted.

(3) Effects

In the second embodiment, the flow control valves 6 to 16 that control the flows of the hydraulic fluids to be supplied from the hydraulic pumps 1 to 3 to the actuators 204*a*, 205*a*, 206*a*, and 211 are directional control valves that control directions and flow rates of the hydraulic fluids to be supplied from the hydraulic pumps 1 to 3 to the actuators 204*a*, 205*a*, 206*a*, and 211, and a regeneration valve 115 is disposed within a spool of the directional control valve 11.

According to the second embodiment configured as described above, with a configuration simpler than that of the first embodiment, the operation speed of the actuators can be increased by the regenerating function while accuracy of position control of the actuators is ensured. It is thus possible to improve work efficiency of the work machine 100 while reducing cost.

The embodiments of the present invention have been described above in detail. However, the present invention is not limited to the foregoing embodiments, and includes various modifications. For example, the foregoing embodiments have been described in detail in order to describe the present invention in an easily understandable manner, and are not necessarily limited to the embodiments including all of the described configurations. In addition, it is possible to add a part of a configuration of a certain embodiment to a configuration of another embodiment, and it is possible to omit a part of a configuration of a certain embodiment or replace a part of a configuration of a certain embodiment with a part of another embodiment.

DESCRIPTION OF REFERENCE CHARACTERS

1: First hydraulic pump
1*a*: Flow rate control command pressure port (regulator)
1*b*: First hydraulic pump self-pressure port (regulator)
1*c*: Second hydraulic pump self-pressure port (regulator)
2: Second hydraulic pump
2*a*: Flow rate control command pressure port (regulator)
2*b*: Second hydraulic pump self-pressure port (regulator)
2*c*: First hydraulic pump self-pressure port (regulator)
3: Third hydraulic pump
3*a*: Flow rate control command pressure port (regulator)
3*b*: Third hydraulic pump self-pressure port (regulator)
5: Hydraulic operating fluid tank
6: Right travelling directional control valve (flow control valve)
7: Bucket directional control valve (flow control valve)
8: Second arm directional control valve (flow control valve)

9: First boom directional control valve (flow control valve)
10: Second boom directional control valve (flow control valve)
11: First arm directional control valve (flow control valve)
12: First attachment directional control valve (flow control valve)
13: Left travelling directional control valve (flow control valve)
14: Swing directional control valve (flow control valve)
15: Third boom directional control valve (flow control valve)
16: Second attachment directional control valve (flow control valve)
17: Confluence valve
18 to 20: Main relief valve
21 to 29: Auxiliary flow control valve (flow control valve)
30: Check valve
31: Main valve
31*a*: Valve disc
31*b*: Control variable restrictor
31*c*: First pressure chamber
31*d*: Second pressure chamber
31*e*: Third pressure chamber
32: Pilot variable restrictor
32*a*: Pilot port
33: Main valve
33*a*: Valve disc
33*b*: Control variable restrictor
33*c*: First pressure chamber
33*d*: Second pressure chamber
33*e*: Third pressure chamber
34: Pilot variable restrictor
34*a*: Pilot port
35: Regeneration valve
36: Variable restrictor valve
41: Center bypass hydraulic fluid line
42 to 47: Hydraulic fluid line
51: Center bypass hydraulic fluid line
52 to 58: Hydraulic fluid line
61: Center bypass hydraulic fluid line
62 to 75: Hydraulic fluid line
81 to 83: Pressure sensor
84 to 86: Stroke sensor
87: Pressure sensor
91: Pilot pump
92: Pilot relief valve
93: Solenoid valve unit
93*a* to 93*h*: Solenoid proportional valve
94, 94A: Controller
94*a*: Control enablement determining section
94*b*: Demanded actuator flow rate computing section
94*c*: Limited actuator flow rate computing section
94*d*: Regeneration flow rate computing section
94*e*: Target actuator flow rate computing section
94*f*: Target actuator supply flow rate computing section
94*g*: Target pump flow rate computing section
94*h*: Target directional control valve opening computing section
94*i*: Target flow control valve opening computing section
94*j*: Target variable restrictor valve opening computing section
94*k*: Target directional control valve opening computing section
95*a*: Boom control lever
95*b*: Arm control lever
96: Automatic control function selector switch
97: Hydraulic fluid line
101 to 109: Check valve
111 to 114: Hydraulic fluid line
117 to 120: Pressure sensor
121, 122: Regeneration port
201: Track structure
202: Swing structure (machine body)
203: Work device
204: Boom
204*a*: Boom cylinder (actuator)
205: Arm
205*a*: Arm cylinder (actuator)
206: Bucket
206*a*: Bucket cylinder (actuator)
207: Cab
208: Machine room
209: Counterweight
210: Control valve
211: Swing motor (actuator)
300: Hydraulic excavator (work machine)
400, 400A: Hydraulic drive system

The invention claimed is:

1. A work machine comprising:
a machine body;
a work device attached to the machine body;
actuators that drive the machine body or the work device;
a hydraulic operating fluid tank;
a hydraulic pump that sucks hydraulic fluid from the hydraulic operating fluid tank and supplies the hydraulic fluid to a corresponding one of the actuators;
flow control valves that are connected in parallel to a delivery line of the hydraulic pump and control a flow of the hydraulic fluid to be supplied from the hydraulic pump to the corresponding one of the actuators;
control levers for giving instructions for operation of the actuators; and
a controller that controls the flow control valves according to operation instruction amounts from the control levers, wherein:
the work machine includes:
a regeneration valve disposed on a hydraulic fluid line that connects a meter-out port and a meter-in port of one of the flow control valves to each other, and
a pressure sensor that senses a differential pressure across the regeneration valve, and
the controller is configured to:
for each of the actuators, compute a target actuator flow rate based on the operation instruction amounts from the control levers,
compute a regeneration flow rate of hydraulic fluid passing through the regeneration valve based on the differential pressure across the regeneration valve,
compute target actuator supply flow rates by subtracting the regeneration flow rate from each of the target actuator flow rates,
compute target flow control valve opening amounts based on the target actuator supply flow rates,
compute a target pump flow rate equal to or more than a sum of the target actuator supply flow rates,
control the flow control valves according to the target flow control valve opening amounts, and
control the hydraulic pump according to the target pump flow rate.

2. The work machine according to claim 1, wherein:

the flow control valves include:

directional control valves that control directions of the hydraulic fluid to be supplied from the hydraulic pump to the actuators, and auxiliary flow control valves that limit flow rates of hydraulic fluid to be supplied from the hydraulic pump to meter-in ports of the directional control valves; and the regeneration valve is disposed on a hydraulic fluid line that connects the meter-out port and the meter-in port of a directional control valve among the directional control valves that corresponds to the one of the flow control valves.

3. The work machine according to claim 1, wherein:

the flow control valves are directional control valves that control directions and flow rates of the hydraulic fluid to be supplied from the hydraulic pump to the actuators, and the regeneration valve is disposed within a spool of a directional control valve among the directional control valves that corresponds to the one of the flow control valves.

4. The work machine according to claim 1, including:

a variable restrictor valve disposed on a hydraulic fluid line that connects the meter-out port of the one of the flow control valves and the hydraulic fluid tank to each other, wherein the controller is configured to, in a case where the regeneration flow rate exceeds the target actuator flow rate of an actuator among the actuators that corresponds to the one of the flow control valves, increase an opening amount of the variable restrictor valve until the regeneration flow rate becomes equal to or lower than the target actuator flow rate among the target actuator flow rates that corresponds to the one of the flow control valves.

5. The work machine according to claim 1, including:

an automatic control function selector switch that gives an instruction for enabling or disabling an automatic control function of the machine body or the work device, wherein the controller is configured to, in a case where the automatic control function selector switch gives an instruction for disabling the automatic control function, compute the target flow control valve opening amounts and the target pump flow rate based on the operation instruction amounts from the control levers.

* * * * *